(12) United States Patent
Liu et al.

(10) Patent No.: US 12,434,331 B2
(45) Date of Patent: Oct. 7, 2025

(54) LASER FORMING NON-SQUARE EDGES IN TRANSPARENT WORKPIECES USING MODIFIED AIRY BEAMS

(71) Applicant: CORNING INCORPORATED, Corning, NY (US)

(72) Inventors: Anping Liu, Horseheads, NY (US); Craig John Mancusi Ungaro, Corning, NY (US)

(73) Assignee: Corning Incorporated, Corning, NY (US)

( * ) Notice: Subject to any disclaimer, the term of this patent is extended or adjusted under 35 U.S.C. 154(b) by 973 days.

(21) Appl. No.: 17/403,998

(22) Filed: Aug. 17, 2021

(65) Prior Publication Data

US 2022/0080531 A1    Mar. 17, 2022

Related U.S. Application Data

(60) Provisional application No. 63/077,200, filed on Sep. 11, 2020.

(30) Foreign Application Priority Data

Sep. 28, 2020 (NL) .................................... 2026552

(51) Int. Cl.
    *B23K 26/53*        (2014.01)
    *B23K 26/06*        (2014.01)
    (Continued)

(52) U.S. Cl.
    CPC .......... *B23K 26/53* (2015.10); *B23K 26/0622* (2015.10); *B23K 26/0648* (2013.01);
    (Continued)

(58) Field of Classification Search
None
See application file for complete search history.

(56) References Cited

U.S. PATENT DOCUMENTS

8,101,929 B1   1/2012   Christodoulides et al.
9,757,815 B2   9/2017   Hosseini
(Continued)

FOREIGN PATENT DOCUMENTS

CN    103018918 A    4/2013
CN    104216121 A    12/2014
(Continued)

OTHER PUBLICATIONS

Gecevicius et al., "Airy beams generated by ultrafast laser-imprinted space-variant nanostructures in glass", In Optics Letters, vol. 39, 2014.
(Continued)

*Primary Examiner* — Edward F Landrum
*Assistant Examiner* — Theodore J Evangelista
(74) *Attorney, Agent, or Firm* — Womble Bond Dickinson (US) LLP

(57) ABSTRACT

A method includes directing a laser beam onto a phase-adjustment device such that the laser beam downstream the phase-adjustment device is a modified Airy beam having a modified Airy beam focal region having a main lobe and a plurality of side lobes. The main lobe has a lobe aspect ratio of 1.2 or greater.

16 Claims, 19 Drawing Sheets

(51) Int. Cl.
*B23K 26/0622* (2014.01)
*B23K 26/073* (2006.01)
*B23K 26/18* (2006.01)
*B23K 103/00* (2006.01)

(52) U.S. Cl.
CPC ............ *B23K 26/073* (2013.01); *B23K 26/18* (2013.01); *B23K 2103/54* (2018.08)

(56) References Cited

U.S. PATENT DOCUMENTS

| | | |
|---|---|---|
| 10,494,290 B2 | 12/2019 | Chen et al. |
| 10,620,444 B2 | 4/2020 | Kumkar et al. |
| 12,006,245 B2 * | 6/2024 | Liu .................... C03B 33/0222 |
| 2005/0173388 A1 | 8/2005 | Lavers et al. |
| 2010/0315636 A1 | 12/2010 | Spriggs et al. |
| 2013/0050838 A1 * | 2/2013 | Nagano .............. B23K 26/0648 359/641 |
| 2014/0027951 A1 | 1/2014 | Srinivas et al. |
| 2015/0038313 A1 | 2/2015 | Hosseini |
| 2015/0158120 A1 | 6/2015 | Courvoisier et al. |
| 2015/0165562 A1 | 6/2015 | Marjanovic et al. |
| 2015/0166393 A1 | 6/2015 | Marjanovic et al. |
| 2015/0205137 A1 | 7/2015 | Soskind et al. |
| 2016/0016257 A1 * | 1/2016 | Hosseini ............ B23K 26/0006 65/355 |
| 2016/0048032 A1 | 2/2016 | Soskind et al. |
| 2016/0159679 A1 | 6/2016 | West |
| 2017/0023841 A1 | 1/2017 | N'Gom et al. |
| 2017/0189991 A1 | 7/2017 | Gollier et al. |
| 2018/0016179 A1 | 1/2018 | Canfield et al. |
| 2018/0062342 A1 | 3/2018 | Comstock et al. |
| 2018/0093914 A1 * | 4/2018 | Akarapu ............ B23K 26/0608 |
| 2018/0221988 A1 | 8/2018 | Liu et al. |
| 2019/0173260 A1 | 6/2019 | Wong et al. |
| 2019/0302465 A1 | 10/2019 | Yu et al. |
| 2022/0073427 A1 | 3/2022 | Ortner et al. |

FOREIGN PATENT DOCUMENTS

| | | | |
|---|---|---|---|
| CN | 104765153 A | 7/2015 | |
| CN | 112882133 A | 6/2021 | |
| EP | 3311947 A1 * | 4/2018 | ......... B23K 26/0648 |

OTHER PUBLICATIONS

Mathis et al., "Micromachining along a curve: Femtosecond laser micromachining of curved profiles in diamond and silicon using accelerating beams", In Applied Physics Letters, vol. 101, 2012, 3 pages.

Ahmed et al., "Display glass cutting by femtosecond laser induced single shot periodic void array", Applied Physics Letters, vol. 93, 2008, pp. 189-192.

Mezentsev et al., "Femtosecond laser microfabrication of subwavelength structures in photonics", Proceesings of SPIE, vol. 6107, 20017, 11 pages.

Polynkin et al., "Curved Plasma Channel Generation Using Ultraintense Airy Beams", Science, vol. 324, 2009, pp. 229-232.

Stuart et al., "Nanosecond-to-femtosecond laser-induced breakdown in dielectrics", Physical Review B, vol. 53, 1996, 13 pages.

Sudrie et al., "Femtosecond Laser-Induced Damage and Filamentary Propagation in Fused Silica", Physical Review, vol. 89, 2002, 4 pages.

International Search Report and Written Opinion of the International Searching Authority; PCT/US2021/047661; dated Jan. 19, 2022; 11 pages; European Patent Office.

Mathis A et al: "Micromachining along a curve: Femtosecond laser micromachining of curved profiles in diamond and silicon using accelerating beams", Applied Physics Letters, A I p Publishing LLC, US, vol. 101, No. 7, Aug. 13, 2012, 11 pages.

Chinese Office action for Application No. 202180076007.X, dated Jul. 18, 2025, 20 pages.

* cited by examiner

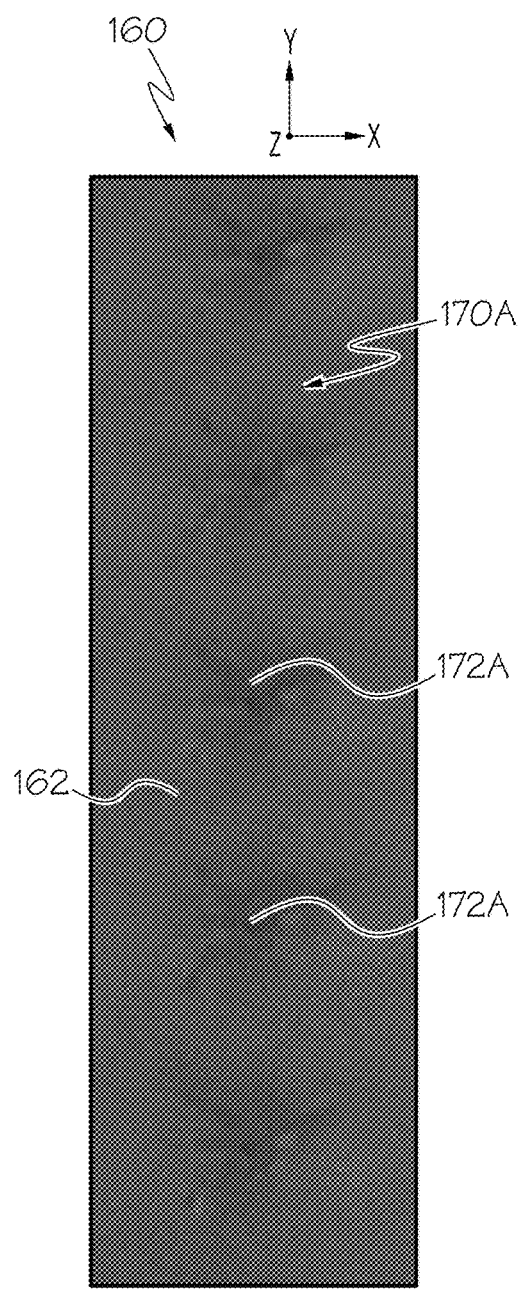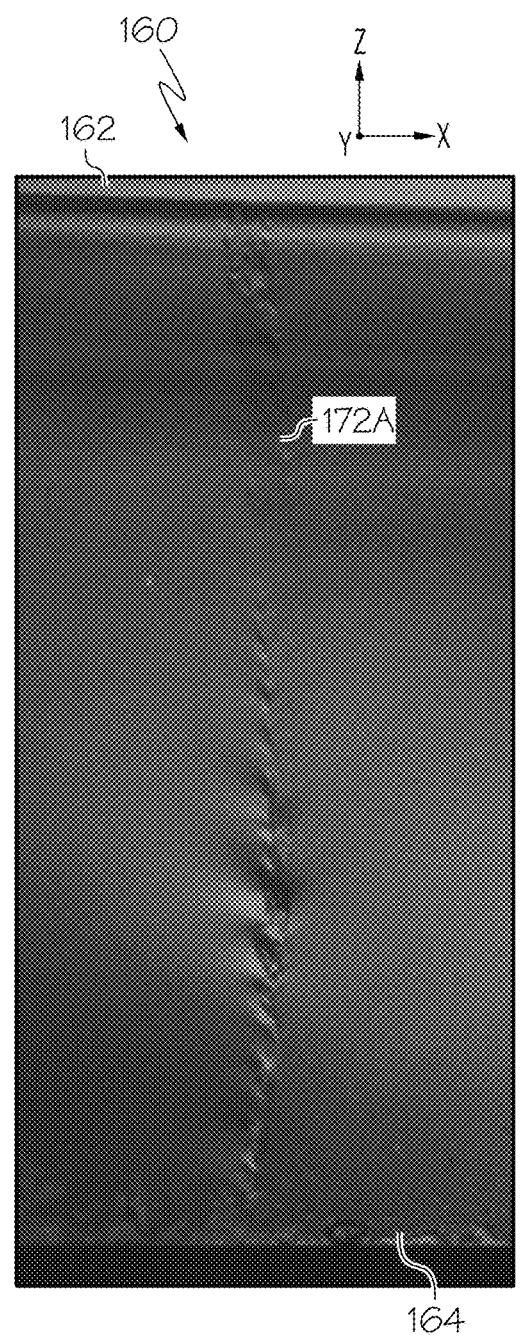
FIG. 6A
FIG. 6B

LASER FORMING NON-SQUARE EDGES IN TRANSPARENT WORKPIECES USING MODIFIED AIRY BEAMS

This application claims the benefit of priority to Dutch Patent Application No. 2026552 filed on Sep. 28, 2020, which claims priority from U.S. Provisional Patent Application Ser. No. 63/077,200 filed on Sep. 11, 2020, the content of which is relied upon and incorporated herein by reference in its entirety.

BACKGROUND

Field

The present disclosure relates to glass processing, and in particular relates to systems and methods for processing glass substrates using modified Airy beams.

Technical Background

Glass processing, including glass cutting (cleaving) and edge finishing, is important in the formation of glass articles such as display glasses, glass panels and cover glasses. In particular, the square edges of glass sheets are prone to breakage and can be processed to have bevels or to be rounded to minimize the chance of breakage. This processing can be accomplished using mechanical means, such as mechanical grinding. Likewise, glass substrates need to be cleaved to have select dimensions and shapes. This processing can also be accomplished using mechanical means, such as a using diamond-blade saw. Unfortunately, mechanical processing of glass substrates is complex and generates glass dust and glass particles, which must be removed.

As an alternative, the cleaving and edge processing operations can be performed using conventional laser processing rather than mechanical process. However, conventional laser processing utilizes laser beams that travel in a straight line in free space and so are difficult to use when a rounded outer edge or like edge shaping is desired.

SUMMARY

According to a first aspect of the present disclosure, a method includes directing a laser beam onto a phase-adjustment device such that the laser beam downstream the phase-adjustment device is a modified Airy beam having a modified Airy beam focal region having a main lobe and a plurality of side lobes, wherein the main lobe has a lobe aspect ratio of 1.2 or greater.

A second aspect of the present disclosure includes the method of the first aspect, wherein the lobe aspect ratio of the main lobe is 1.5 or greater.

A third aspect of the present disclosure includes the method of the first method or the second aspect, wherein the lobe aspect ratio of the main lobe is 2 or greater.

A fourth aspect of the present disclosure includes the method of any of the previous aspects, wherein the lobe aspect ratio of the main lobe is 3 or greater.

A fifth aspect of the present disclosure includes the method of any of the previous aspects, wherein at least 60% of a laser energy of the modified Airy beam focal region is disposed in the main lobe.

A sixth aspect of the present disclosure includes the method of any of the previous aspects, wherein at least 65% of a laser energy of the modified Airy beam focal region is disposed in the main lobe.

A seventh aspect of the present disclosure includes the method of any of the previous aspects, wherein at least 68% of a laser energy of the modified Airy beam focal region is disposed in the main lobe.

An eighth aspect of the present disclosure includes the method of any of the previous aspects, wherein the phase-adjustment device includes a phase plate having a cubic phase modulation.

A ninth aspect of the present disclosure includes the method of any of the previous aspects, wherein the phase-adjustment device includes a phase modulation function $\emptyset=(\alpha k)^3 (x^3+(\alpha_y y)^3)$, where $\alpha$ is a frequency of phase modulation, $$k = \frac{2\pi}{\lambda},$$

where $\lambda$ is a wavelength of the laser beam, x and y are spatial coordinates of the phase-adjustment device and $\alpha_y$ is a phase modulation frequency ratio and $\alpha_y$ is 0.8 or less.

A tenth aspect of the present disclosure includes the method of the ninth aspect, wherein $\alpha_y$ is 0.6 or less.

An eleventh aspect of the present disclosure includes the method of any of the previous aspects, wherein the laser beam is a pulsed laser beam having pulse bursts and each pulse burst of the pulsed laser beam has from 2 sub-pulses to 20 sub-pulses.

A twelfth aspect of the present disclosure includes the method of any of the previous aspects, further including directing the modified Airy beam onto a transparent workpiece such that the modified Airy beam forms the modified Airy beam focal region in the transparent workpiece, the modified Airy beam focal region inducing absorption in the transparent workpiece, the induced absorption producing a curved defect in the transparent workpiece.

A thirteenth aspect of the present disclosure includes the method of the twelfth aspect, further including translating at least one of the transparent workpiece and the modified Airy beam relative to each other along a contour line to form a contour having a plurality of curved defects.

A fourteenth aspect of the present disclosure includes the method of the thirteenth aspect, wherein a spacing between adjacent curved defects of the plurality of curved defects is 35 µm or less.

A fifteenth aspect of the present disclosure includes the method of the thirteenth aspect or the fourteenth aspect, further including applying a stress to the contour to separate the transparent workpiece along the contour, thereby forming a non-square edge on the transparent workpiece.

A sixteenth aspect of the present disclosure includes the method of any of the twelfth through the fifteenth aspects, wherein the transparent workpiece is borosilicate glass, soda-lime glass, aluminosilicate glass, alkali aluminosilicate glass, alkaline earth aluminosilicate glass, alkaline earth boro-aluminosilicate glass, fused silica, sapphire, silicon, or gallium arsenide.

According to a seventeenth aspect of the present disclosure, a method includes directing a laser beam output by a beam source onto a beam shaping element such that the laser beam downstream the beam shaping element includes a modified laser beam having an asymmetric cross sectional shape and directing the modified laser beam onto a phase-adjustment device such that the modified laser beam projects an asymmetric beam spot onto the phase-adjustment device and the modified laser beam downstream the phase-adjustment device is a modified Airy beam, wherein the asymmetric beam spot has a beam spot aspect ratio of 1.5 or greater.

An eighteenth aspect of the present disclosure includes the method of the seventeenth aspect, wherein the modified Airy beam includes a modified Airy beam focal region having a main lobe and a plurality of side lobes and at least 59% of a laser energy of the modified Airy beam focal region is disposed in the main lobe.

A nineteenth aspect of the present disclosure includes the method of the seventeenth or eighteenth aspects, wherein the modified Airy beam includes a modified Airy beam focal region having a main lobe and a plurality of side lobes and at least 65% of a laser energy of the modified Airy beam focal region is disposed in the main lobe.

A twentieth aspect of the present disclosure includes the method of any of the seventeenth through nineteenth aspects, wherein the beam spot aspect ratio is 3.0 or greater.

A twenty-first aspect of the present disclosure includes the method of any of the seventeenth through twentieth aspects, wherein the beam spot aspect ratio is 4.0 or greater.

A twenty-second aspect of the present disclosure includes the method of any of the seventeenth through twenty-first aspects, wherein the phase-adjustment device includes a phase plate having a cubic phase modulation.

A twenty-third aspect of the present disclosure includes the method of any of the seventeenth through twenty-second aspects, wherein the phase-adjustment device includes a phase modulation function $\emptyset=(\alpha k)^3 (x^3+(\alpha_y y)^3)$, where $\alpha$ is a frequency of phase modulation, $$k = \frac{2\pi}{\lambda},$$

where $\lambda$ is a wavelength of the laser beam, x and y are spatial coordinates of the phase-adjustment device and $\alpha_y$ is a phase modulation frequency ratio; and $\alpha_y$ is 0.8 or less.

A twenty-fourth aspect of the present disclosure includes the method of the twenty-third aspect, wherein $\alpha_y$ is 0.6 or less.

A twenty-fifth aspect of the present disclosure includes the method of any of the seventeenth through twenty-fourth aspects, wherein the beam shaping element includes one or more refractive optical elements, diffractive optical elements, or a combination thereof.

A twenty-sixth aspect of the present disclosure includes the method of any of the seventeenth through twenty-fifth aspects, wherein the modified Airy beam focal region includes a main lobe and a plurality of side lobes and the main lobe includes a lobe aspect ratio of 1.5 or greater.

A twenty-seventh aspect of the present disclosure includes the method of any of the seventeenth through twenty-sixth aspects, wherein the modified Airy beam focal region includes a main lobe and a plurality of side lobes and the main lobe includes a lobe aspect ratio of 2 or greater.

A twenty-eighth aspect of the present disclosure includes the method of any of the seventeenth through twenty-seventh aspects, wherein the modified Airy beam focal region includes a main lobe and a plurality of side lobes and the main lobe includes a lobe aspect ratio of 3 or greater.

A twenty-ninth aspect of the present disclosure includes the method of any of the seventeenth through twenty-eighth aspects, further including directing the modified Airy beam onto a transparent workpiece such that the modified Airy beam forms the modified Airy beam focal region in the transparent workpiece, the modified Airy beam focal region inducing absorption in the transparent workpiece, the induced absorption producing a curved defect in the transparent workpiece.

A thirtieth aspect of the present disclosure includes the method of the twenty-ninth aspect, further including translating at least one of the transparent workpiece and the modified Airy beam relative to each other along a contour line to form a contour having a plurality of curved defects.

A thirty-first aspect of the present disclosure includes the method of the thirtieth aspect, wherein a spacing between adjacent curved defects of the plurality of curved defects is 35 µm or less.

A thirty-second aspect of the present disclosure includes the method of the thirtieth or thirty-first aspects, further including applying a stress to the contour to separate the transparent workpiece along the contour, thereby forming a non-square edge on the transparent workpiece.

A thirty-third aspect of the present disclosure includes the method of any of the thirtieth through thirty-second aspects, wherein the plurality of curved defects include a central defect region and one or more radial arms that extends outward from the central defect region along the contour line.

A thirty-fourth aspect of the present disclosure includes the method of the thirty-third aspect, wherein the modified Airy beam focal region includes a main lobe and a plurality of side lobes, wherein the main lobe is asymmetric, has a horizontal lobe axis, a vertical lobe axis, and a lobe aspect ratio of 1.2 or greater and when the modified Airy beam focal region induces absorption in the transparent workpiece to form each curved defect, the horizontal lobe axis of the main lobe of the modified Airy beam focal region is aligned with at least one radial arm of the curved defect.

A thirty-fifth aspect of the present disclosure includes the method of any of the seventeenth through thirty-fourth aspects, wherein the laser beam is a pulsed laser beam having pulse bursts and each pulse burst of the pulsed laser includes comprises from 2 sub-pulses to 20 sub-pulses.

According to a thirty-sixth aspect of the present disclosure, a modified Airy beam includes a modified Airy beam focal region having a main lobe and a plurality of side lobes, wherein the main lobe has a lobe aspect ratio of 1.2 or greater.

A thirty-seventh aspect of the present disclosure includes the modified Airy beam of the thirty-sixth aspect, wherein the lobe aspect ratio of the main lobe is 1.5 or greater.

A thirty-eighth aspect of the present disclosure includes the modified Airy beam of the thirty-sixth or thirty-seventh aspects, wherein the lobe aspect ratio of the main lobe is 2 or greater.

A thirty-ninth aspect of the present disclosure includes the modified Airy beam of any of the thirty-sixth through thirty-eighth aspects, wherein the lobe aspect ratio of the main lobe is 3 or greater.

A fortieth aspect of the present disclosure includes the modified Airy beam of any of the thirty-sixth through thirty-ninth aspects, wherein the lobe aspect ratio of the main lobe is 4 or greater.

A forty-first aspect of the present disclosure includes the modified Airy beam of any of the thirty-sixth through fortieth aspects, wherein at least 60% of a laser energy of the modified Airy beam focal region is disposed in the main lobe.

A fourth-second aspect of the present disclosure includes the modified Airy beam of any of the thirty-sixth through forty-first aspects, wherein at least 65% of a laser energy of the modified Airy beam focal region is disposed in the main lobe.

A fourth-third aspect of the present disclosure includes the modified Airy beam of any of the thirty-sixth through forty-second aspects, wherein at least 68% of a laser energy of the modified Airy beam focal region is disposed in the main lobe.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 6A is a top view of an exemplary contour of curved defects formed in a transparent workpiece using the optical assembly of FIG. 1A, according to one or more embodiments shown and described herein;

FIG. 6B is a side view of a curved defect of the exemplary contour of FIG. 6A, according to one or more embodiments shown and described herein;

DETAILED DESCRIPTION

Figure 1A:
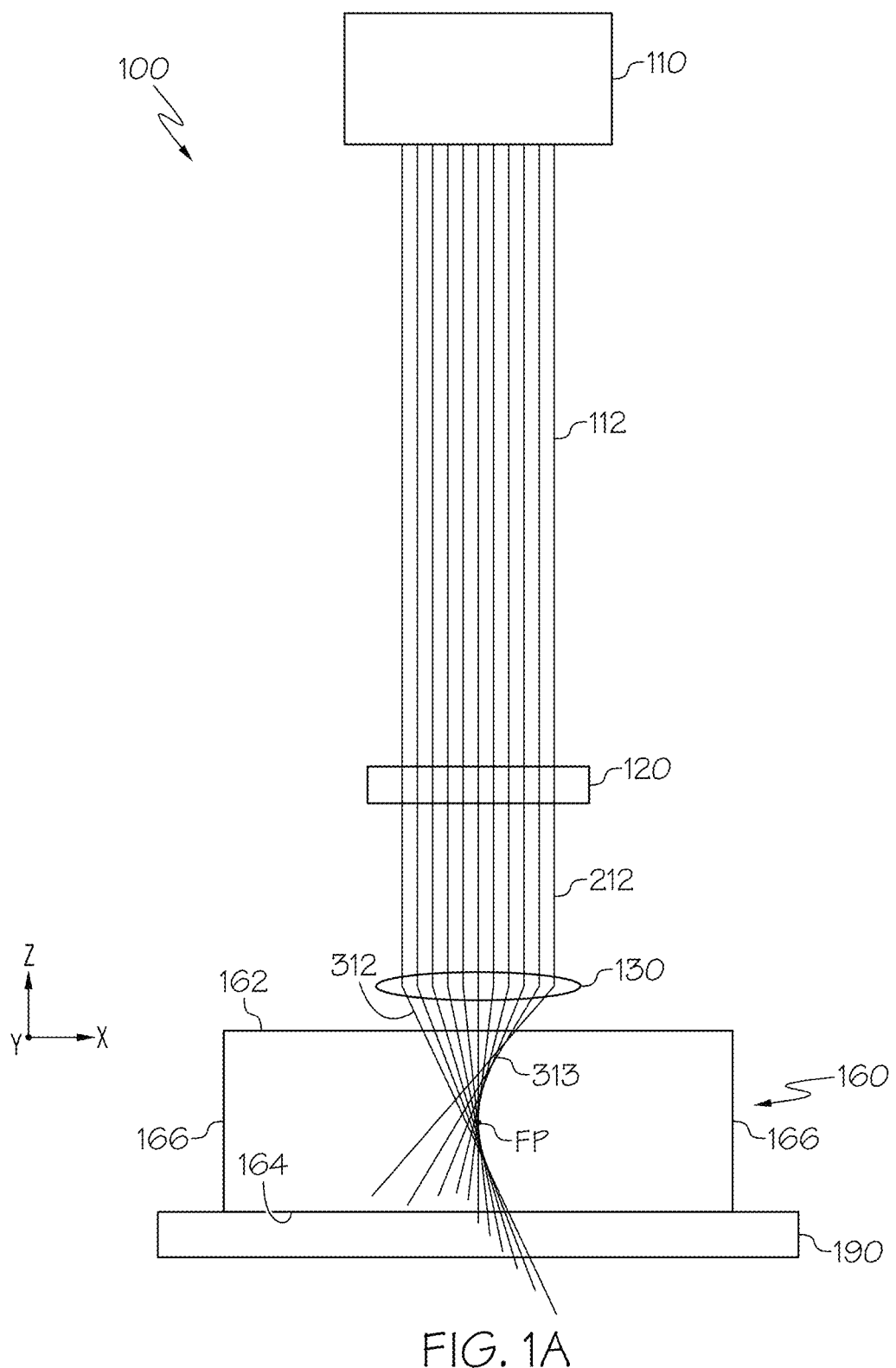
FIG. 1A schematically depicts an example optical system that includes a phase-adjustment device for forming an Airy beam and processing a transparent workpiece using the Airy beam, according to one or more embodiments shown and described herein.

Separating and edge finishing play a key role in many products formed from transparent workpieces, for example, glass products such as display glasses and cover glasses. In particular, transparent workpieces having square edges are prone to breakage propagating from these edges. Thus, square edges are often processed to form non-square edges, such as rounded edges, beveled edges, or the like, to minimize the chance of breakage. Currently, non-square edges are often formed using mechanical means, such as mechanical grinding and polishing. However, these mechanical processes generate glass dust and particles, which must be cleaned by additional process steps involving washing or chemical treatments. Thus, it is desirable to replace conventional edge finishing processes with a particle-free and high-throughput process of forming non-square edges. Laser processing using an Airy beam having self-bending characteristics provides one solution to form a particle-free and high-throughput process of forming non-square edges.

The optical systems and methods described herein use an Airy beam having self-bending characteristics to provide a high-throughput process of forming non-square edges with minimal particle generation and unwanted damage. In particular, the optical systems and methods described herein use modified Airy beams to form curved defects in a transparent workpiece to minimize unintended damage to the transparent workpiece and facilitate efficient separation with minimal roughness on the resultant non-square edges. The modified Airy beam described herein has a greater percentage of laser energy concentrated in the main lobe than in an unmodified Airy beam. For example, in an unmodified Airy beam about 50% of the laser energy may be concentrated in the main lobe, while in the modified Airy beam described herein, about 68% of the laser energy may be concentrated in the main lobe. As the main lobe is the portion of the Airy beam (e.g., portion of an Airy beam focal region) that is used to modify the transparent workpiece, increasing the percentage of laser power concentrated in the main lobe increases the efficiency of laser processing and improves process throughput. Reference is now made in detail to various embodiments of the disclosure, examples of which are illustrated in the accompanying drawings. Whenever possible, the same or like reference numbers and symbols are used throughout the drawings to refer to the same or like parts.

While not intending to be limited by theory, an "Airy beam" refers to a type of laser beam that comprises a curvature in free space due to the beam having a select phase. An Airy beam may be formed by directing a conventional Gaussian laser beam through a phase-adjustment device, such as a phase plate, which increases the depth of focus and changes the propagation trajectory of the beam. In some embodiments, the Airy beam may be referred to as a self-bending beam, an accelerating beam, a self-accelerating beam, or a non-diffracting beam. A cross-section of the Airy beam (i.e., a cross section orthogonal to the propagation trajectory of the beam) comprises multiple lobes, including a main lobe and a plurality of sidelobes. The main lobe is the largest lobe and is the lobe with the highest energy. When the Airy beam is used during a transparent workpiece separation process, a non-square edge can be formed due to the curvature of the Airy beam and the energy in the main lobe is used to modify a transparent workpiece (e.g., ablate, form defects, or otherwise alter to facilitate separation of the transparent workpiece).

As used herein, "laser processing" comprises directing a laser beam onto and/or into a transparent workpiece. In some embodiments, laser processing further comprises translating the laser beam relative to the transparent workpiece, for example, along a contour line or other pathway. Examples of laser processing include using an Airy beam to form a contour comprising a series of curved defects that extend into the transparent workpiece. The transparent workpiece may be separated along the contour comprising the series of curved defect by additional laser processes, such as by using an infrared laser beam.

As used herein, "upstream" and "downstream" refer to the relative position of two locations or components along a beam pathway with respect to a beam source. For example, a first component is upstream from a second component if the first component is closer to the beam source along the path traversed by the laser beam than the second component.

As used herein, "contour line," corresponds to the set of intersection points of the laser beam with the incident surface of a transparent workpiece resulting from relative motion of the laser beam and the transparent workpiece. A contour line can be a linear, angled, polygonal or curved in shape. A contour line can be closed (i.e. defining an enclosed region on the surface of the substrate) or open (i.e. not defining an enclosed region on the surface of the substrate). The contour line represents a boundary along which separation of the substrate into two or more parts is facilitated.

As used herein, "contour," refers to a set of defects (e.g., curved defects) in the transparent workpiece formed by a laser beam through relative motion of a laser beam and the substrate along a contour line. The defects are spaced apart along the contour line and are wholly contained within the interior of the transparent workpiece or extend through one or more surfaces into the interior of the transparent workpiece. Defects may also extend through the entire thickness of the transparent workpiece. Separation of the transparent workpiece occurs by connecting defects, such as, for example, through propagation of a crack.

As used herein, a "defect" refers to a region of a transparent workpiece that has been modified by a laser beam and. As the defects described herein are formed by an Airy beam having self-bending characteristics, the defects are curved in correspondence to the curve of the Airy beam and are thus referred to hereinafter as "curved defects." Curved defects include regions of a transparent workpiece having a modified refractive index relative to surrounding unmodified regions of the transparent workpiece. Curved defects may include structurally modified regions such as void spaces, cracks, scratches, flaws, holes, perforations, densifications, or other deformities in the transparent workpiece produced by an Airy beam. A curved defect is formed through interaction of an Airy beam (in particular, a main lobe of an Airy beam) with the transparent workpiece. As described more fully below, the Airy beam is produced by a pulsed laser. A curved defect at a particular location along the contour line is formed from a main lobe of an Airy beam produced by a single laser pulse at the particular location, a pulse burst of sub-pulses at the particular location, or multiple laser pulses at the particular location. Relative motion of the laser beam and transparent workpiece along the contour line results in multiple curved defects that form a contour.

The phrase "transparent workpiece," as used herein, means a workpiece formed from glass, glass-ceramic or other material which is transparent, where the term "transparent," as used herein, means that the material has a linear optical absorption of less than 20% per mm of material depth, such as less than 10% per mm of material depth for the specified pulsed laser wavelength, or such as less than 1% per mm of material depth for the specified pulsed laser wavelength. Unless otherwise specified, the material has a linear optical absorption of less than about 20% per mm of material depth. The transparent workpiece may have a depth (e.g., thickness) of from about 50 microns (µm) to about 10 mm (such as from about 100 µm to about 5 mm, or from about 0.5 mm to about 3 mm). Transparent workpieces may comprise glass workpieces formed from glass compositions, such as borosilicate glass, soda-lime glass, aluminosilicate glass, alkali aluminosilicate, alkaline earth aluminosilicate glass, alkaline earth boro-aluminosilicate glass, fused silica, or crystalline materials such as sapphire, silicon, gallium arsenide, or combinations thereof. In some embodiments, the transparent workpiece may be strengthened via thermal tempering before or after laser processing the transparent workpiece. In some embodiments, the glass may be ion-exchangeable, such that the glass composition can undergo ion-exchange for glass strengthening before or after laser processing the transparent workpiece. For example, the transparent workpiece may comprise ion exchanged and ion exchangeable glass, such as Corning Gorilla® Glass available from Corning Incorporated of Corning, N.Y. (e.g., code 2318, code 2319, and code 2320). Further, these ion-exchanged glasses may have coefficients of thermal expansion (CTE) of from about 6 ppm/° C. to about 10 ppm/° C. Other example transparent workpieces may comprise EAGLE XG® and CORNING LOTUS™ available from Corning Incorporated of Corning, N.Y. Moreover, the transparent workpiece may comprise other components, which are transparent to the wavelength of the laser, for example, glass ceramics or crystals such as sapphire or zinc selenide.

In an ion exchange process, ions in a surface layer of the transparent workpiece are replaced by larger ions having the same valence or oxidation state, for example, by partially or fully submerging the transparent workpiece in an ion exchange bath. Replacing smaller ions with larger ions causes a layer of compressive stress to extend from one or more surfaces of the transparent workpiece to a certain depth within the transparent workpiece, referred to as the depth of layer. The compressive stresses are balanced by a layer of tensile stresses (referred to as central tension) such that the net stress in the glass sheet is zero. The formation of compressive stresses at the surface of the glass sheet makes the glass strong and resistant to mechanical damage and, as such, mitigates catastrophic failure of the glass sheet for flaws, which do not extend through the depth of layer. In some embodiments, smaller sodium ions in the surface layer of the transparent workpiece are exchanged with larger potassium ions. In some embodiments, the ions in the surface layer and the larger ions are monovalent alkali metal cations, such as Li+(when present in the glass), Na+, K+, Rb+, and Cs+. Alternatively, monovalent cations in the surface layer may be replaced with monovalent cations other than alkali metal cations, such as Ag+, Tl+, Cu+, or the like.

Referring now to FIG. 1A, an optical system 100 for laser processing a transparent workpiece 160 is depicted. The transparent workpiece 160 comprises a first surface 162, a second surface 164 opposite the first surface 162, and one or more edges 166. As shown in FIG. 1A, the edges 166 are square edges. The optical system 100 is configured to transform a laser beam 112 (e.g., a Gaussian laser beam) into a phase-adjusted laser beam 212 which, when focused using a focusing lens 130, forms an Airy beam 312 that focuses into an Airy beam focal region 313. The Airy beam 312 may be used to form a series of curved defects 172 (FIG. 2A) in the transparent workpiece 160 along which the transparent workpiece 160 may be separated to form one or more non-square edges 168 (FIG. 2B).

The optical system 100 comprises a beam source 110 that emits the laser beam 112, which may comprise a Gaussian laser beam. While not intending to be limited by theory, Gaussian beams decay monotonically and the diameter of a Gaussian beam is typically defined by a $1/e^2$ drop in intensity relative to the maximum intensity of the Gaussian beam. In some embodiments, the laser beam 112 emitted by the beam source 110 is pulsed and comprises short light pulses (e.g., in the range from femtoseconds to picoseconds) or pulse bursts having a closely spaced series of sub-pulses. In some embodiments, the beam source 110 may output a laser beam 112 comprising a wavelength of, for example, 1064 nm, 1030 nm, 532 nm, 530 nm, 355 nm, 343 nm, or 266 nm, or 215 nm. Further, the laser beam 112 that is transformed into the Airy beam 312 and used to form curved defects 172 in the transparent workpiece 160 may be well suited for materials that are transparent to the selected laser wavelength. Suitable laser wavelengths for forming curved defects 172 are wavelengths at which the combined losses of linear absorption and scattering by the transparent workpiece 160 are sufficiently low.

Referring still to FIG. 1A, the optical system 100 further comprises a phase-adjustment device 120 positioned downstream the beam source 110 such that the laser beam 112 (e.g., a pulsed laser beam) emitted by the beam source 110 impinges (e.g., traverses or reflects from) the phase-adjustment device 120 and thereafter traverses the focusing lens 130. The phase-adjustment device 120 is configured to adjust a phase of the laser beam 112 to form a phase-adjusted laser beam 212. In particular, the phase-adjustment device 120 adds a cubic phase modulation to the laser beam 112 to form a phase-adjusted laser beam 212 downstream from the phase-adjustment device 120. The cubic phase modulation applied to form the phase-adjusted laser beam 212 is such that, when the phase-adjusted laser beam 212 is focused by the focusing lens 130, the phase-adjusted laser beam 212 forms into an Airy beam 312 which focuses into an Airy beam focal region 313 near the focal point FP of the focusing lens 130. Without intending to be limited by theory, the phase-adjusted laser beam 212 is a laser beam with a cubic phase and the Airy beam 312 is the Fourier transform of a cubic phase, where the focusing lens 130 causes the Fourier transformation.

Figure 1B:
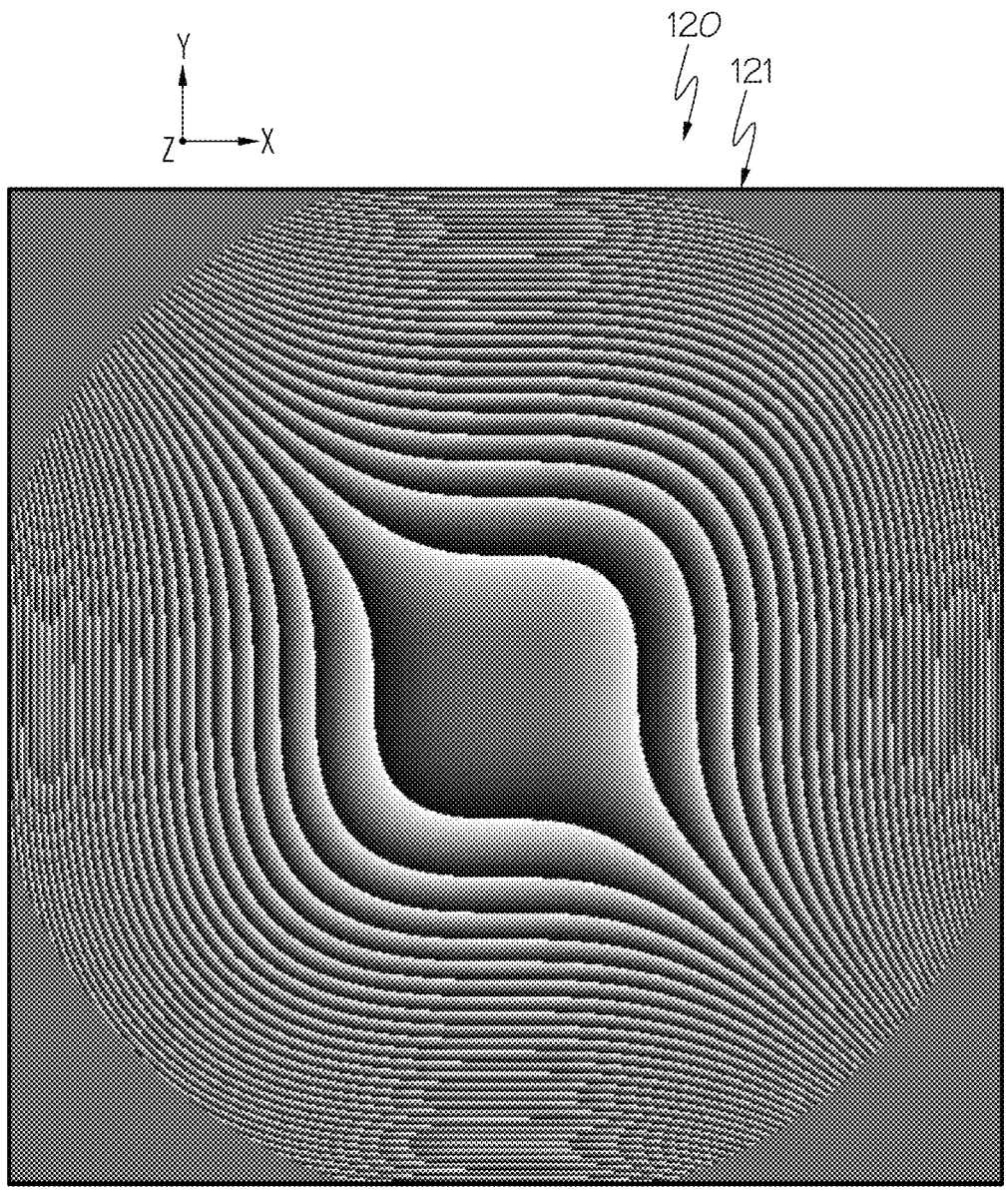
FIG. 1B schematically depicts a phase contour map of the phase-adjustment device of FIG. 1A, according to one or more embodiments shown and described herein.

Referring now to FIGS. 1A and 1B, the phase function of the Airy beam can be expressed by Eq. (1) as $$\emptyset = (\alpha k)^3 (x^3 + y^3) \quad (1)$$

where Ø is the phase, α is the frequency of phase modulation, $$k = \frac{2\pi}{\lambda}$$

and is the wave vector of the laser beam 112, x and y are the spatial coordinates of the phase function. In particular, FIG. 1B shows a cubic phase mask 121 used by the phase-adjustment device 120 to ultimately form the Airy beam 312 and Airy beam focal region 313 downstream the focusing lens 130. In some embodiments, the phase-adjustment device 120 comprises a diffractive optical element, such as a phase plate having a cubic phase modulation (which may be an Airy phase plate or Airy phase mask) pre-made on an optical surface and in other embodiments; the phase-adjustment device 120 comprises a spatial light modulator comprising a large number of pixels with adjustable refractive indices. In embodiments in which the phase-adjustment device 120 comprises a phase plate, the cubic phase mask 121 corresponds to the surface topography of the phase plate. The phase-adjustment device 120 may be transmissive or reflective. For example, phase plate embodiments of the phase-adjustment device 120 may be transmissive and spatial light modulator embodiments of the phase-adjustment device 120 may be reflective. Moreover, embodiments are contemplated in which the phase-adjustment device 120 comprises a spatial light modulator having both a lens phase and a cubic phase or diffracted cubic phase, such that the Airy beam 312 is formed immediately downstream the spatial light modulator without the need for the focusing lens 130.

Figure 1C:
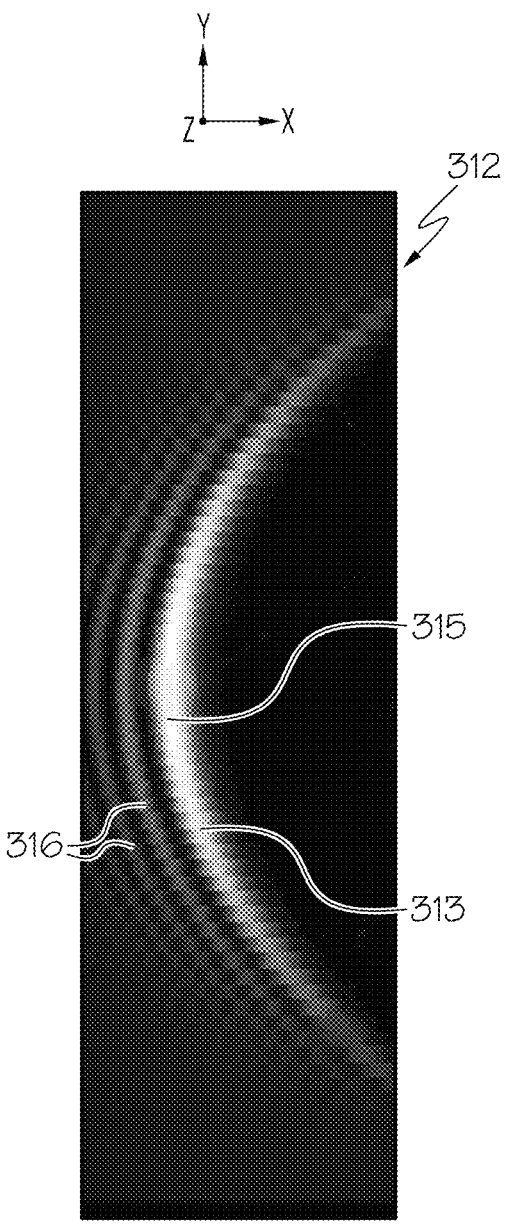
FIG. 1C schematically depicts an Airy beam focal region formed using the optical system of FIG. 1A, according to one or more embodiments shown and described herein.
Figure 1D:
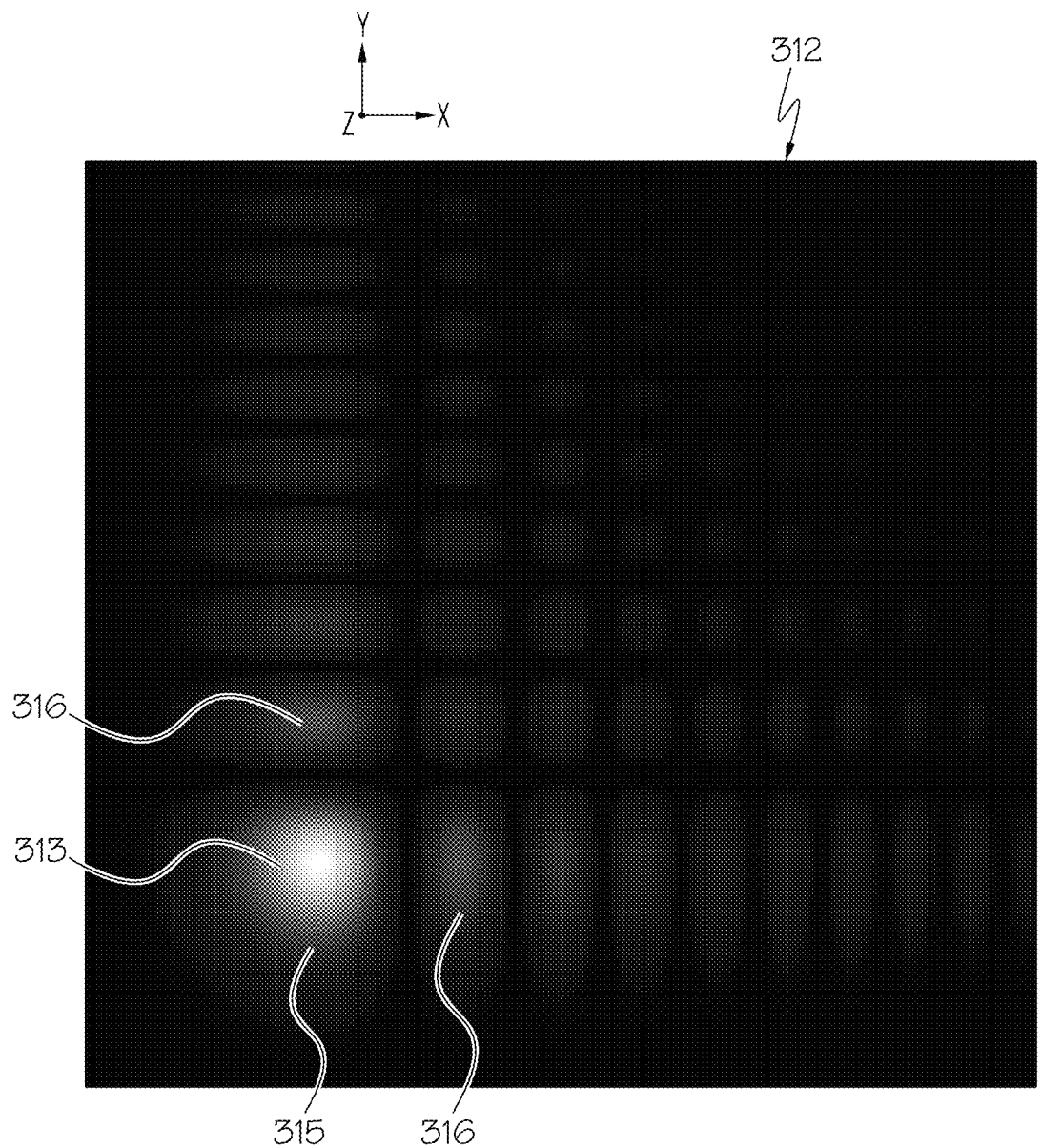
FIG. 1D schematically depicts a beam cross section of the Airy beam focal region of FIG. 1C, according to one or more embodiments shown and described herein.

The Airy beam focal region 313 of representative Airy beam 312 is shown in more detail in FIGS. 1C and 1D. Due to the cubic nature of the phase of the Airy beam 312, it exhibits a curved trajectory when focused by the focusing lens 130. Indeed, FIG. 1C depicts the curved beam path of the Airy beam focal region 313, which is the Airy beam 312 near the focal point FP of the focusing lens 130. The section of the Airy beam focal region 313 with the highest intensity is a main lobe 315 (see FIG. 1D), which corresponds with the curved portion shown in FIGS. 1A. and 1C. In addition, the Airy beam focal region 313 further comprises a plurality of side lobes 316, each comprising a lower intensity than the main lobe 315. The side lobes 316 of FIGS. 1C and 1D correspond with the crossing rays offset from the curved portion of the Airy beam focal region 313 in FIG. 1A. Without intending to be limited by theory, the characteristics of Airy beam 312 are affected by the phase modulation of the Gaussian beam 112, by the phase-adjustment device 120, and by the focusing lens 130. In particular, the exemplary Airy beam focal region 313 depicted in FIG. 1D was produced from a Gaussian beam having a $1/e^2$ diameter of 6 mm and wavelength $\lambda=1064$ nm using a phase-adjustment device 120 with a phase function defined by Eq. (1) having $\alpha=1.2\times10^{-4}$ and focused using a focusing lens 130 having a focal length of 30 mm. In the example of FIG. 1D, the main lobe 315 is 10 μm×10 μm in cross section and contains 47.7% of the total laser energy of the Airy beam focal region 313.

Figure 2A:
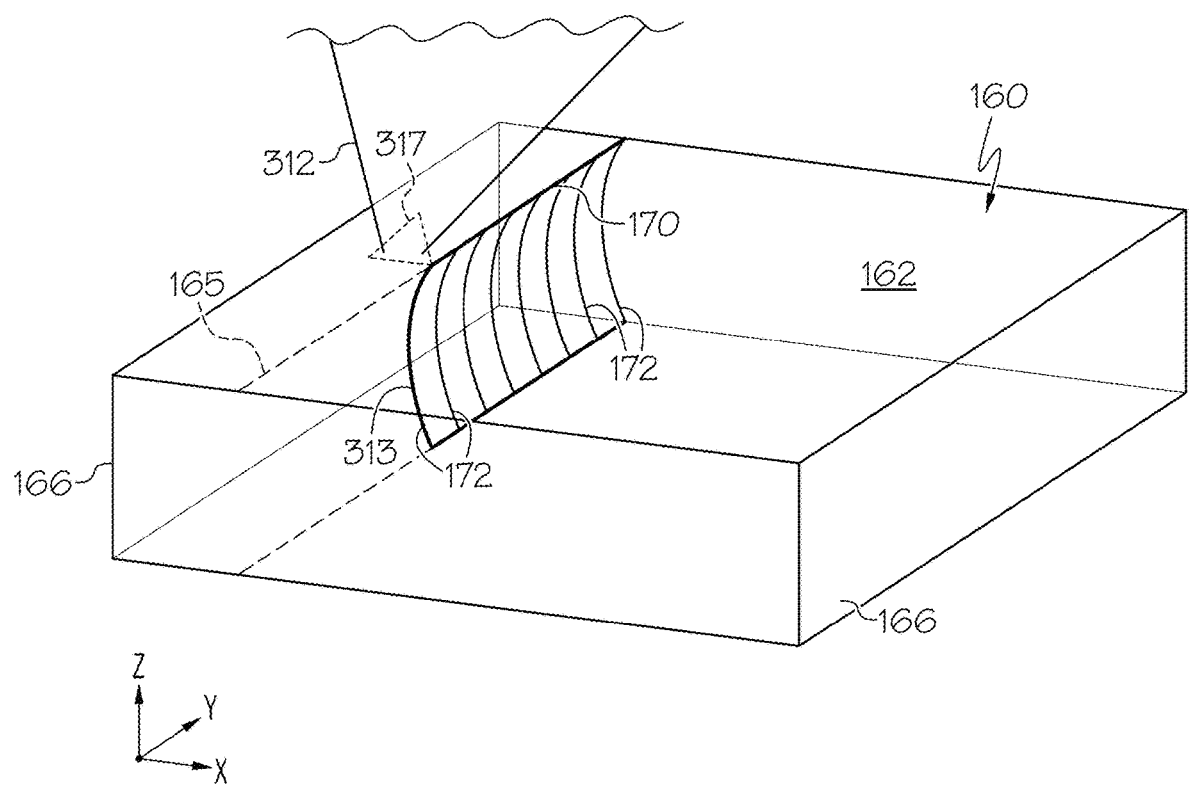
FIG. 2A schematically depicts the formation of a contour of curved defects in a transparent workpiece, according to one or more embodiments shown and described herein.
Figure 2B:
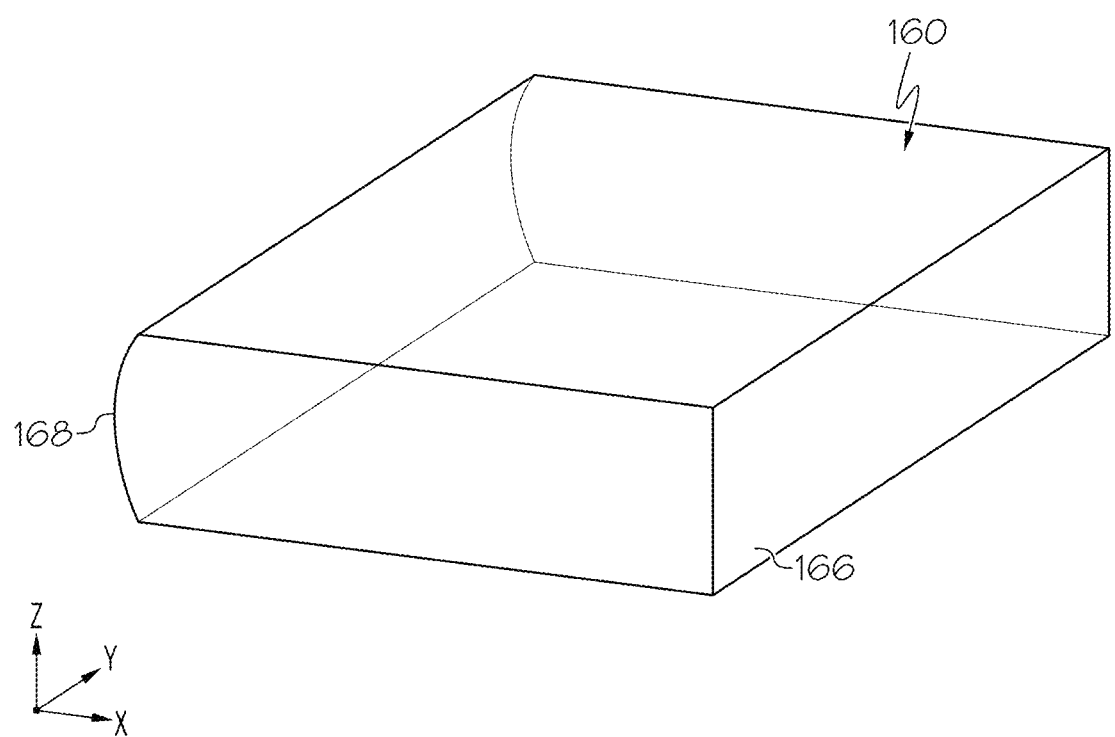
FIG. 2B schematically depicts the transparent workpiece of FIG. 2A have a non-square edge formed after separation of the contour of curved defects, according to one or more embodiments shown and described herein.

Referring now to FIGS. 2A and 2B, when the Airy beam 312 is directed into the transparent workpiece 160, the Airy beam focal region 313 induces absorption of laser energy in the transparent workpiece 160, forming a curved defect 172. In operation, the curved defects 172 of the contour 170 are produced by interaction of the transparent workpiece 160 with the Airy beam focal region 313. In particular, the main lobe 315 of the Airy beam focal region 313 may create multi-photon absorption (MPA) in the transparent workpiece 160. MPA is the simultaneous absorption of two or more photons of identical or different frequencies that excites a molecule from one state (usually the ground state) to a higher energy electronic state (i.e., ionization). The energy difference between the involved lower and upper states of the molecule is equal to the sum of the energies of the involved photons. MPA, also called induced absorption, can be a second-order or third-order process (or higher order), for example, that is several orders of magnitude weaker than linear absorption. It differs from linear absorption in that the strength of second-order induced absorption may be proportional to the square of the light intensity, for example, and thus it is a nonlinear optical process. Without intending to be limited by theory, generating an induced absorption in the transparent workpiece 160 deposits enough energy to break chemical bonds in the transparent workpiece 160 at spaced locations along the contour line 165 to form the curved defects 172.

Referring still to FIGS. 2A and 2B, the contour 170 comprising a series of curved defects 172 may be formed in the transparent workpiece 160 by irradiating the contour line 165 with the Airy beam 312 and translating at least one of the Airy beam 312 and the transparent workpiece 160 relative to each other along the contour line 165 to form the curved defects 172 of the contour 170. The Airy beam 312 may project an Airy beam spot 317 on the first surface 162 of the transparent workpiece 160 corresponding with the cross sectional shape of the Airy beam 312 depicted in FIG. 1D. According to one or more embodiments, the Airy beam 312 may be translated across the transparent workpiece 160 by motion of the transparent workpiece 160 (e.g., motion of a translation stage 190 (FIG. 3A) coupled to the transparent workpiece 160), motion of the Airy beam 312, or motion of both the transparent workpiece 160 and the Airy beam 312. By translating at least one of the Airy beam 312 relative to the transparent workpiece 160, the plurality of curved defects 172 may be formed in the transparent workpiece 160.

While the contour 170 depicted in FIG. 2A is linear, it should be understood that the contour 170 may be non-linear, for example, curved. Further, in some embodiments, the contour 170 may be a closed contour, such as a circle, rectangles, ellipses, squares, hexagons, ovals, regular geometric shapes, irregular shapes, polygonal shapes, arbitrary shapes, and the like. Furthermore, the curved defects 172 may generally be spaced apart from one another by a distance along the contour 170 of from 0.1 μm to 500 μm, such as, 1 μm to 200 μm, 2 μm to 100 μm, or 5 μm to 20 μm, 0.1 μm to 50 μm, 5 μm to 15 μm, 5 μm to 12 μm, 7 μm to 15 μm, 8 μm to 15 μm, or 8 μm to 12 μm, such as 50 μm or less, 45 μm or less, 40 μm or less, 35 μm or less, 30 μm or less, 25 μm or less, 20 μm or less, 15 μm or less, 10 μm or less, such as 100 μm, 75 μm, 50 μm, 40 μm, 30 μm, 25 μm, 10 μm, 5 μm, or any range having any two of these values as endpoints.

Referring still to FIGS. 2A and 2B, after forming the contour 170 of curved defects 172, the transparent workpiece 160 may be further acted upon in a subsequent separating step to induce separation of the transparent workpiece 160 along the contour 170. As shown in FIG. 2B, separation of the transparent workpiece 160 forms one or more non-square edges 168 in the transparent workpiece 160. The subsequent separating step may include using mechanical force, thermal stress induced force, or a chemical etchant to propagate a crack along the contour 170. The thermal source, such as an infrared laser beam, may be used to create thermal stress and thereby separate the transparent workpiece 160 along the contour 170. Separating the transparent workpiece 160 may include directing an infrared laser beam at the contour 170 to induce thermal stress to propagate a crack along the contour 170. In some embodiments, the infrared laser beam may be used to initiate separation and then the separation may be finished mechanically. Example infrared lasers include a carbon dioxide laser (a "$CO_2$ laser"), a carbon monoxide laser (a "CO laser"), a solid-state laser, a laser diode, or combinations thereof.

Without being bound by theory, the infrared laser is a controlled heat source that rapidly increases the temperature of the transparent workpiece 160 at or near the contour 170. This rapid heating may build compressive stress in the transparent workpiece 160 on or adjacent to the contour 170. Since the area of the heated glass surface is relatively small when compared to the overall surface area of the transparent workpiece 160, the heated area cools relatively rapidly. The resultant temperature gradient induces tensile stress in the transparent workpiece 160 sufficient to propagate a crack along the contour 170 and through the depth of the transparent workpiece 160, resulting in full separation of the transparent workpiece 160 along the contour 170. Without being bound by theory, it is believed that the tensile stress may be caused by expansion of the glass (i.e., changed density) in portions of the transparent workpiece 160 with higher local temperature.

As shown in FIGS. 2A and 2B, separating the transparent workpiece 160 along the contour 170 of the curved defects 172 forms a non-square edge 168 (e.g., a bullnose edge). The shape of the plurality of curved defects 172 control the resultant shape of the non-square edge 168. The shape of the plurality of curved defects 172 is determined by the trajectory of the Airy beam focal region 313 in a beam propagation direction through the depth of the transparent workpiece 160. Without intending to be limited by theory, the two parameters that affect the trajectory of the Airy beam focal region 313 are the phase modulation frequency of the phase-adjustment device 120 and the focal length of the focusing lens 130. For example, increasing the phase modulation frequency of the phase-adjustment device 120 and/or reducing the focal length of the focusing lens 130 may reduce the radius of the non-square edge 168, which increases the curvature of the non-square edge 168. However, both increasing the phase modulation frequency of the phase-adjustment device 120 and reducing the focal length of the focusing lens 130 reduces the beam intensity of the main lobe 315. To illustrate, the Airy beam 312 depicted in FIGS. 1C and 1D, which comprise a wavelength of 1064 nm, were formed using a phase-adjustment device 120 having a phase modulation frequency of $1.2 \times 10^{-5}$ and a focusing lens 130 having a focal length of 30 mm and comprises a main lobe 315 with 47.7% of laser energy of the Airy beam focal region 313. By increasing the phase modulation frequency of the phase-adjustment device 120 to $1.5 \times 10^{-5}$ and reducing the focal length of the focusing lens 130 to 15 mm, the main lobe 315 drops to 35% of laser energy of the Airy beam focal region 313.

Figure 3A:
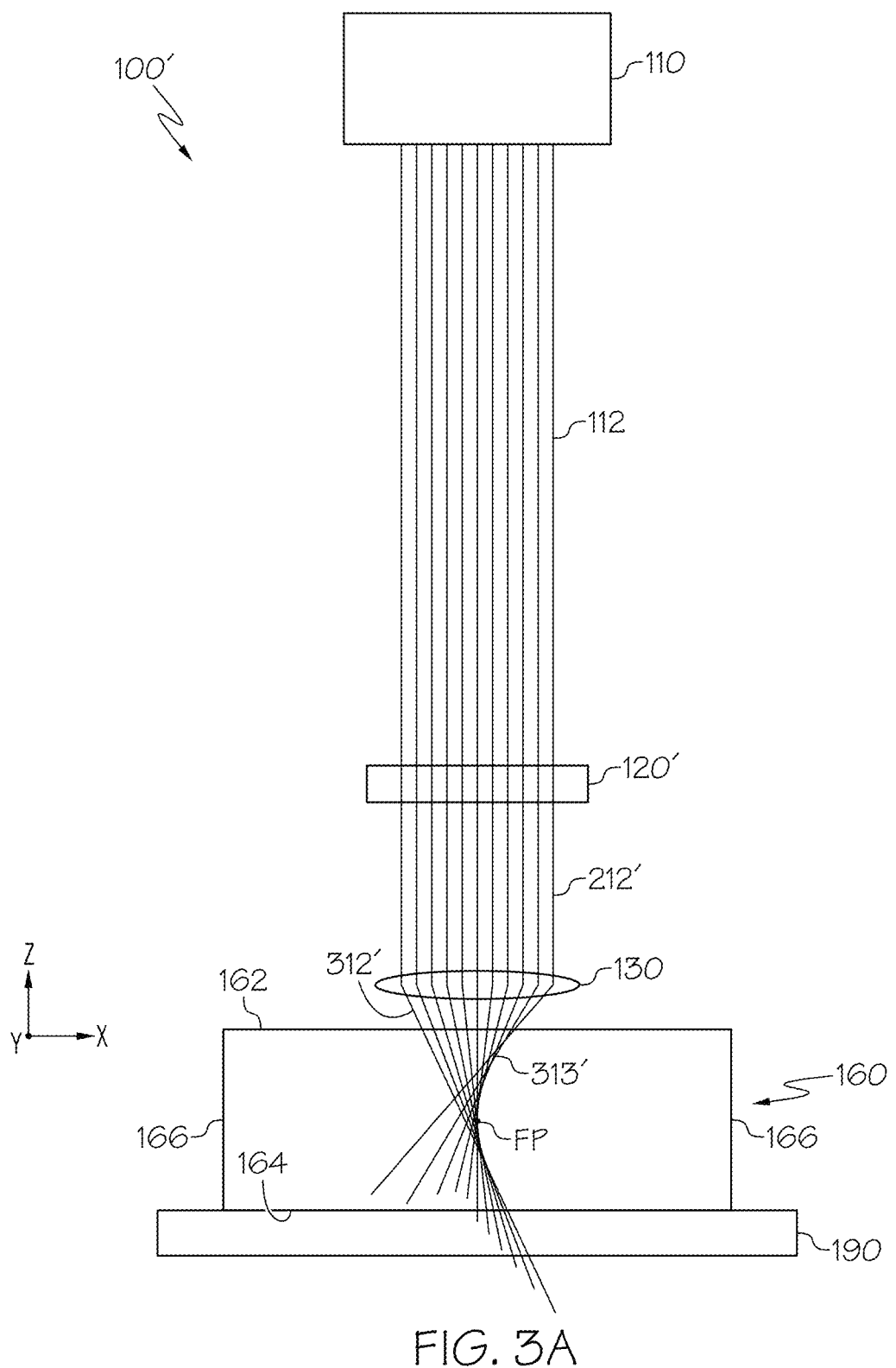
FIG. 3A schematically depicts an example optical system that includes a modified phase-adjustment device for forming a modified Airy beam and processing a transparent workpiece using the modified Airy beam, according to one or more embodiments shown and described herein.

Referring now to FIGS. 3A-3E, one technique to increase the efficiency (fraction of laser power contained in the main lobe) of an Airy beam 312 is to apply a cubic phase modulation using a modified phase-adjustment device 120' having a phase modulation frequency ratio $\alpha_y$ (ratio of phase modulation frequency in the y-direction to the phase modulation frequency in the x-direction) that is less than 1 or greater than 1 such that the modulation frequencies in the x and y directions are different. Unequal modulation frequencies in the x-direction and y-direction alter the size, shape, and energy of the lobes (e.g., main lobe 315'A, 315'B and side lobes 316'A, 316'B) of the Airy beam relative to the lobes (e.g. main lobe 315 and side lobes 316) of an unmodified Airy beam focal region 313 to form a modified Airy beam focal region 313'. For example, FIG. 3A depicts an optical system 100' configured to transform the Gaussian laser beam 112 into a modified phase-adjusted laser beam 212' which, when focused using the focusing lens 130, forms a modified Airy beam 312' that focuses into the modified Airy beam focal region 313'. The optical system 100' includes the optical system 100 of FIG. 1A in which the phase-adjustment device 120 (which has a phase modulation frequency ratio of 1) is now a modified phase-adjustment device 120' (which has a phase modulation frequency ratio different from 1).

In some embodiments, the modified phase-adjustment device 120' comprises a diffractive optical element, such as a phase plate having a cubic phase modulation (which may be an Airy phase plate) pre-made on an optical surface and in other embodiments; the modified phase-adjustment device 120' comprises a spatial light modulator comprising a large number of pixels with adjustable refractive indices. In embodiments in which the modified phase-adjustment device 120' comprises a phase plate, a cubic phase mask 121'A, 121'B (FIGS. 3B and 3D) corresponds to the surface topography of the phase plate. Moreover, the modified phase-adjustment device 120' may be transmissive or reflective. For example, phase plate embodiments of the modified phase-adjustment device 120' may be transmissive and spatial light modulator embodiments of the modified phase-adjustment device 120' may be reflective.

The modified phase-adjustment device 120' comprises a different phase modulation frequency than the phase modulation frequency of the phase-adjustment device 120 of FIG. 1A in one or both of the x-direction and the y-direction. For example, the phase modulation function of the modified phase-adjustment device 120' may be mathematically described as $\emptyset = (\alpha k)^3 (x^3 + (\alpha_y y)^3)$ where $\emptyset$ is the phase, $\alpha$ is the frequency of phase modulation, $$k = \frac{2\pi}{\lambda}$$

and is the wave vector of the laser beam 112, x and y are the spatial coordinates of the phase modulation function, and $\alpha_y$ is the phase modulation frequency ratio defined above.

In each of the embodiments described herein, the modified phase-adjustment device 120' comprises a phase modulation frequency ratio that is less than 1 or greater than 1. In other words, the phase modulation frequency of the modified phase-adjustment device 120' in the x direction is different than the phase modulation frequency of the modified phase-adjustment device 120' in the y direction. Without intending to be limited by theory, the phase modulation frequency difference may alter the size, shape, and energy of the lobes (i.e., the main lobe 315'A, 315'B and the side lobes 316'A, 316'B) of the modified Airy beam focal region 313' formed from the modified phase-adjusted laser beam 212' relative to the lobes (e.g. main lobe 315 and side lobes 316) of the Airy beam focal region 313 formed from the unmodified phase-adjusted laser beam 212. In particular, the phase modulation frequency difference forms the main lobe 315'A, 315'B having a greater concentration of intensity and an asymmetrical shape relative to main lobe 315 (when using an equivalent Gaussian beam).

Figure 3B:
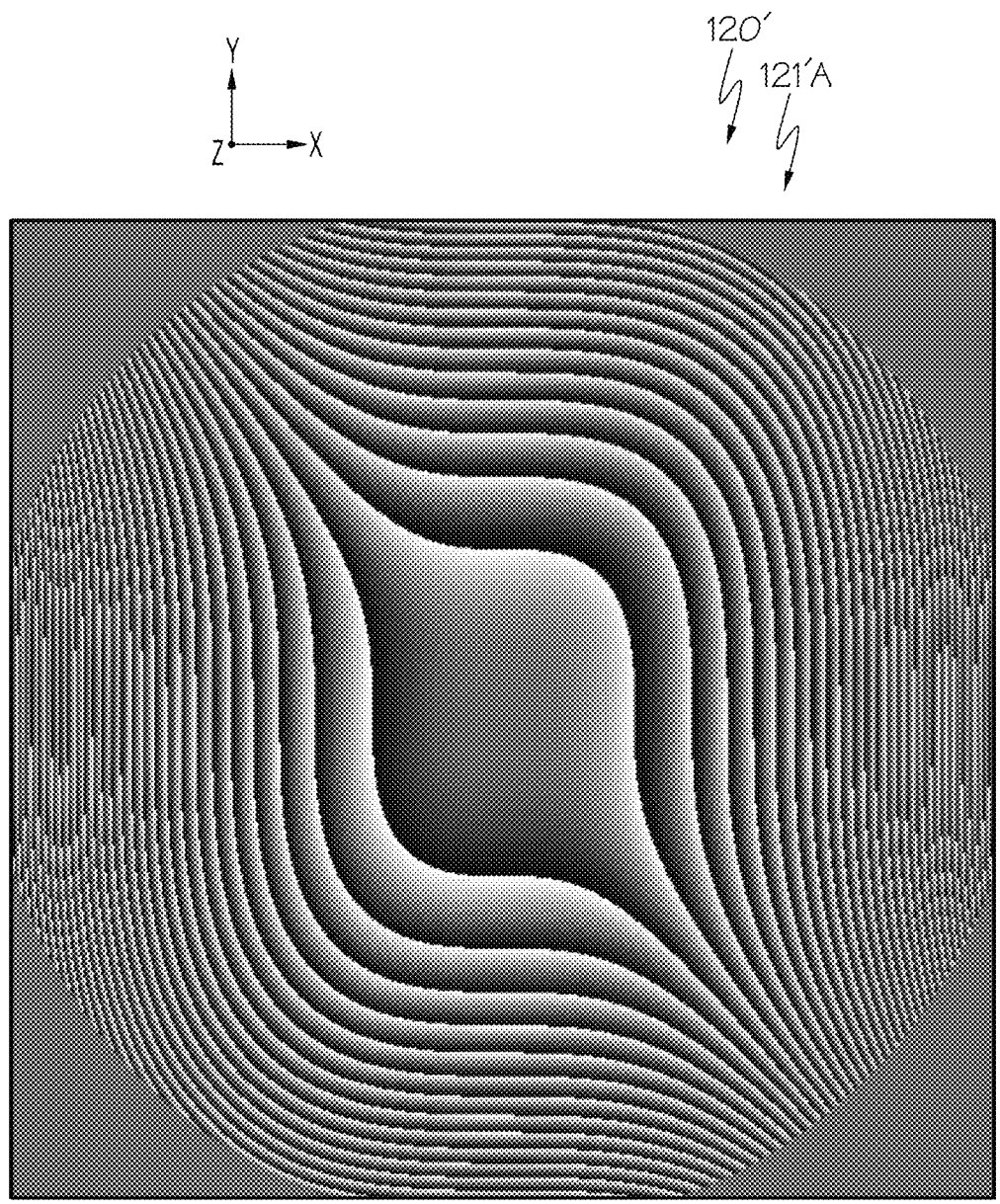
FIG. 3B schematically depicts a phase contour map of an example modified phase-adjustment device of FIG. 3A having a phase modulation frequency ratio $\alpha_y$ of 0.8, according to one or more embodiments shown and described herein.
Figure 3C:
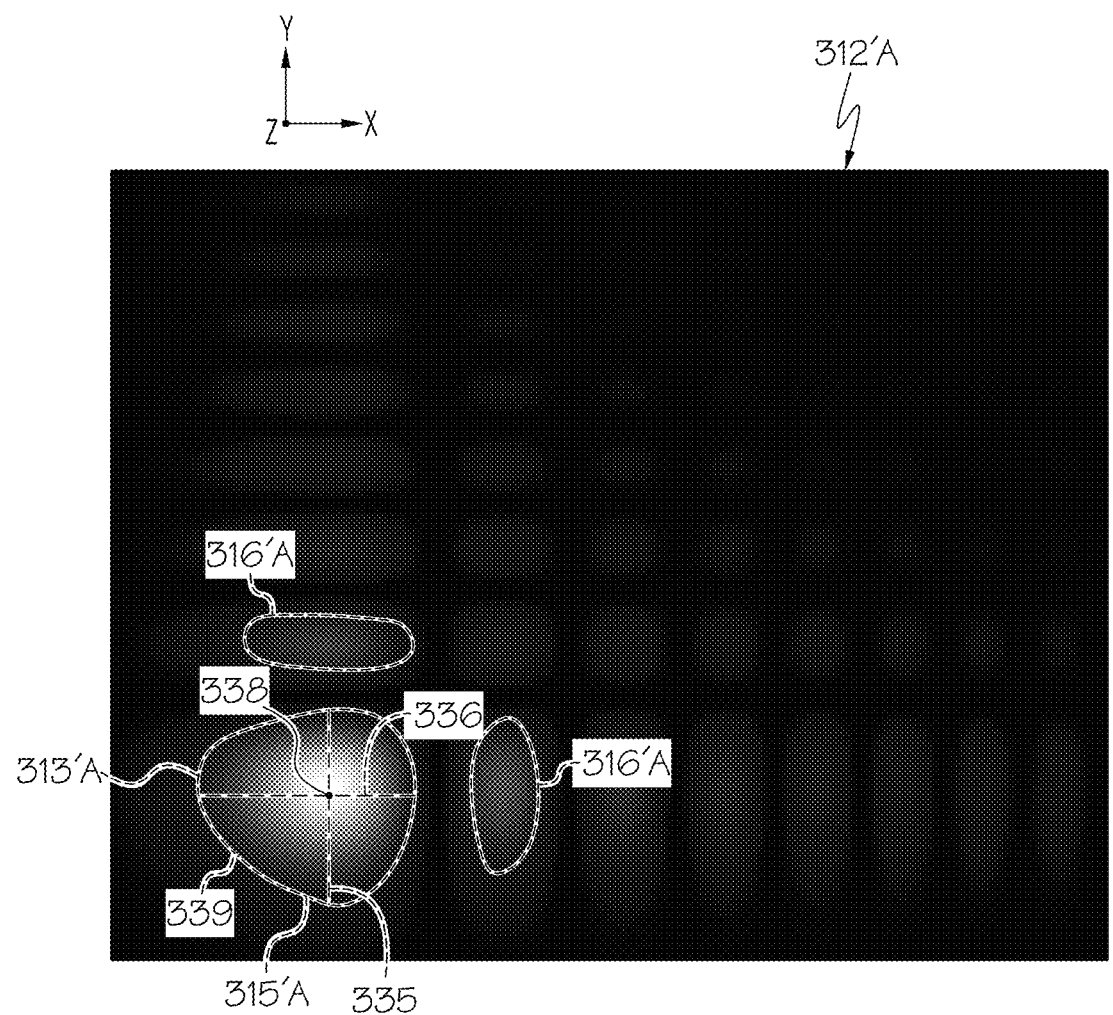
FIG. 3C schematically depicts a beam cross section of an Airy beam focal region formed using the exemplary modified phase-adjustment device of FIG. 3B, according to one or more embodiments shown and described herein.

Referring now to FIG. 3B, one example phase modulation function of the modified phase-adjustment device 120' is depicted as the cubic phase mask 121'A. In particular, the modified phase-adjustment device 120' having the cubic phase mask 121'A of FIG. 3B comprises a phase plate or spatial light modulator having a phase modulation frequency ratio $\alpha_y$ of 0.8. By contrast, the phase modulation frequency ratio of the phase-adjustment device 120 of FIG. 1A is 1. FIG. 3C depicts the intensity distribution of a beam cross section of an embodiment of the modified Airy beam 312'A comprising a wavelength of 1064 nm that is formed by traversing (or reflecting from) the modified phase-adjustment device 120' having the cubic phase mask 121'A and focusing using the focusing lens 130 having a focal length of 30 mm. By lowering the phase modulation frequency ratio, the higher order lobes (i.e., the side lobes 316'A) of the modified Airy beam 312' formed using the cubic phase mask 121'A are suppressed, decreasing the intensity of the side lobes 316'A and increasing the intensity of the main lobe 315'A. In particular, the main lobe 315'A comprises 55% of the laser energy of the modified Airy beam focal region 313'A formed using formed using the cubic phase mask 121'A, while the main lobe 315 of the Airy beam focal region 313 of FIG. 1C comprises 47.7% of the laser energy of the Airy beam focal region 313.

Figure 3D:
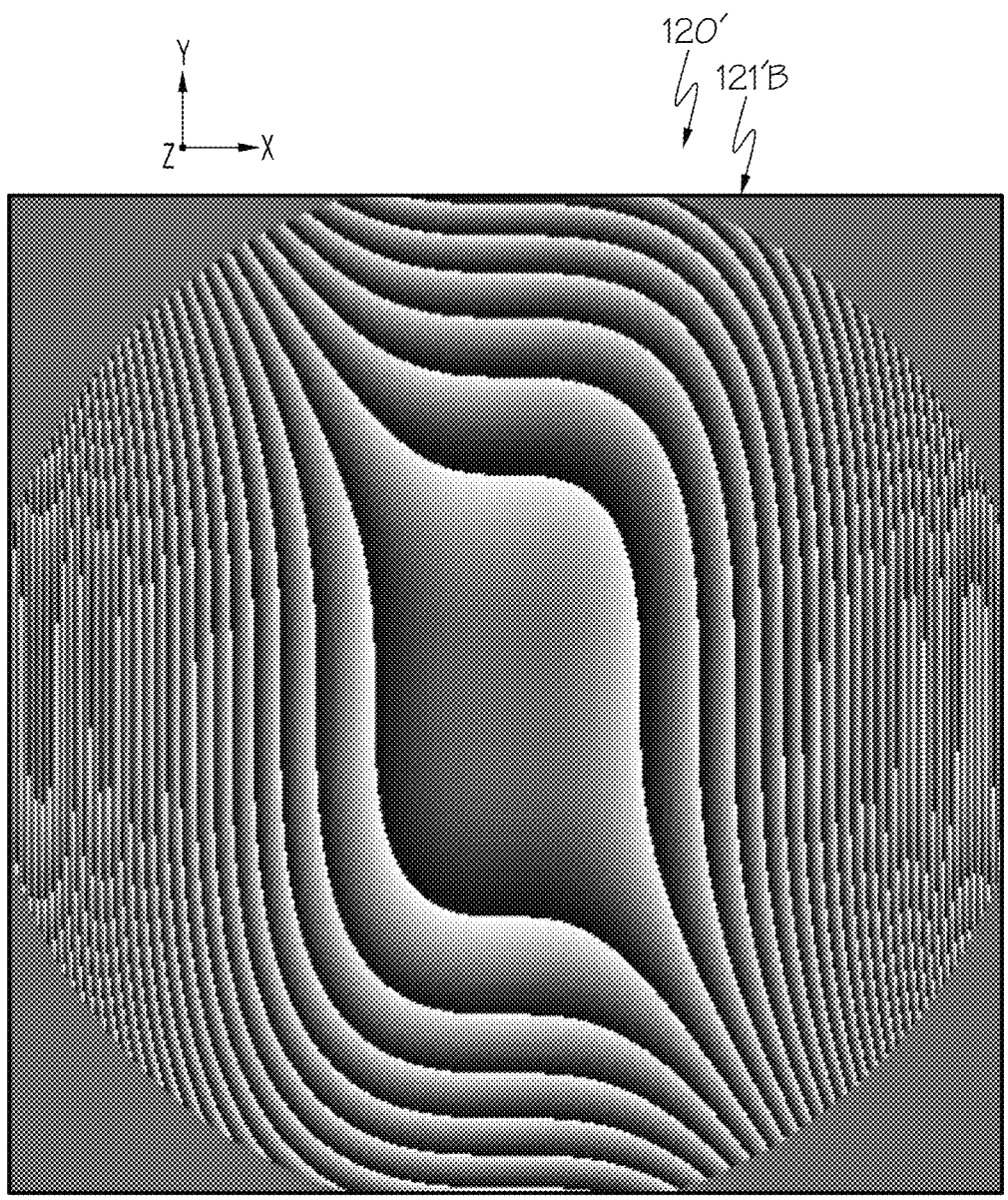
FIG. 3D schematically depicts a phase contour map of an example modified phase-adjustment device of FIG. 3A having a phase modulation frequency ratio $\alpha_y$ of 0.6, according to one or more embodiments shown and described herein.
Figure 3E:
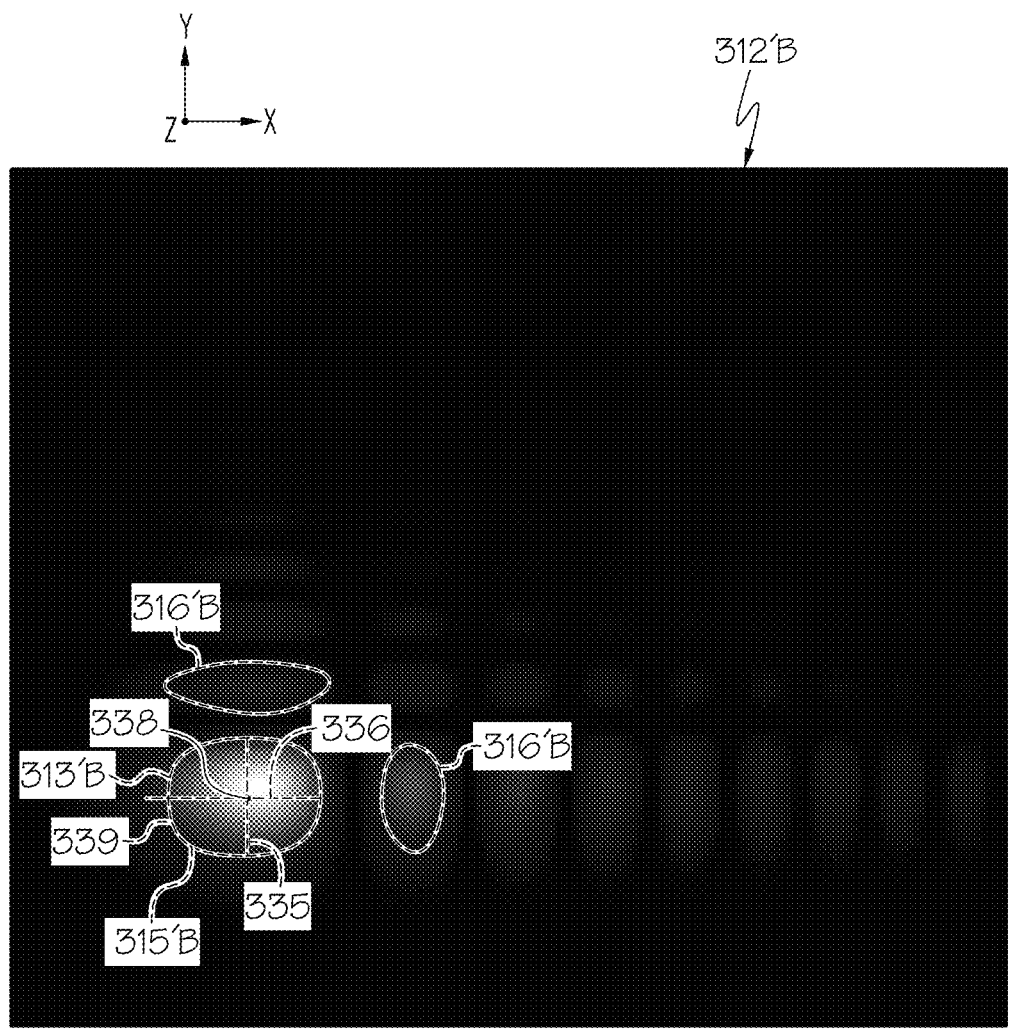
FIG. 3E schematically depicts a beam cross section of an Airy beam focal region formed using the exemplary modified phase-adjustment device of FIG. 3D, according to one or more embodiments shown and described herein.

Referring now to FIG. 3D, another example phase modulation function of the modified phase-adjustment device 120' is depicted as the cubic phase mask 121'B. In particular, the modified phase-adjustment device 120' having the cubic phase mask 121'B of FIG. 3D comprises a phase plate or spatial light modulator having a phase modulation frequency ratio $\alpha_y$ of 0.6, which further suppresses the intensities of the side lobes 316'B (when compared to side lobes 316'A) and increases the intensity of the main lobe 315'B (when compared to the main lobe 315'A). In addition, FIG. 3E depicts the intensity distribution of a beam cross section of the modified Airy beam 312'B comprising a wavelength of 1064 nm that is formed by traversing (or reflecting from) the example modified phase-adjustment device 120' having the cubic phase mask 121'B and focusing using the focusing lens 130 having a focal length of 30 mm. In particular, the main lobe 315'B of the modified Airy beam 312'B formed by the cubic phase mask 121'B comprises 62.4% of the laser energy of the modified Airy beam 312'B, while the main lobe 315 of the Airy beam focal region 313 of FIG. 1C comprises 47.7% of the laser energy of the Airy beam focal region 313.

Referring again to FIGS. 3A-3E, reducing the phase modulation frequency ratio increases the relative laser energy of the main lobe 315' of the modified Airy beam 312' and the modified Airy beam focal region 313'. Using the optical assembly 100' of FIG. 3A, at least 55% of the laser energy of the modified Airy beam focal region 313' may be disposed in the main lobe 315', for example, at least at least 56% of the laser energy, at least 57% of the laser energy, at least 58% of the laser energy, at least 59% of the laser energy, at least 60% of the laser energy, at least 61% of the laser energy, at least 62% of the laser energy, at least 63% of the laser energy, at least 64% of the laser energy, at least 65% of the laser energy, at least 66% of the laser energy, at least 67% of the laser energy, at least 68% of the laser energy, at least 69% of the laser energy, at least 70% of the laser energy, at least 71% of the laser energy, at least 72% of the laser energy, or any range having any two of these values as endpoints.

The main lobe 315' (e.g. 315'A, 315'B) of the modified Airy beam focal region 313' (e.g. 313'A, 313'B) also comprises an asymmetrical shape a lobe perimeter 339 defined by the $1/e^2$ intensity drop of the main lobe 315'. As the main lobe 315' of the modified Airy beam focal region 313' is asymmetrical, it comprises a lobe aspect ratio defined as a ratio of the greatest extent between locations of the lobe perimeter 339 along the horizontal axis (i.e., the X-axis) and the greatest extent between location of the lobe perimeter 339 along the vertical axis (i.e., the Y-axis). As used herein, the X-axis is the direction of Airy beam deflection, the Z-axis is the beam propagation direction, and the Y-axis is orthogonal to both the X-axis and the Z-axis. The greatest horizontal (X-axis) extent is depicted as horizontal lobe axis 336 and the greatest vertical (Y-axis) extent is depicted as vertical lobe axis 335, where the horizontal lobe axis 336 crosses vertical lobe axis 335 at axis intersection 338. In some embodiments, the lobe aspect ratio of the main lobe 315' is 1.1 or greater, such as 1.2 or greater, 1.3 or greater, 1.4 or greater, 1.5 or greater, 1.6 or greater, 1.7 or greater, 1.8 or greater, 1.9 or greater, 2.0 or greater, 2.1 or greater, 2.2 or greater, 2.3 or greater, 2.4 or greater, 2.5 or greater, 2.6 or greater, 2.7 or greater, 2.8 or greater, 2.9 or greater, 3.0 or greater, 3.1 or greater, 3.2 or greater, 3.3 or greater, 3.4 or greater, 3.5 or greater, 3.6 or greater, 3.7 or greater, 3.8 or greater, 3.9 or greater, 4.0 or greater, or any range having any two of these values as endpoints.

Figure 4A:
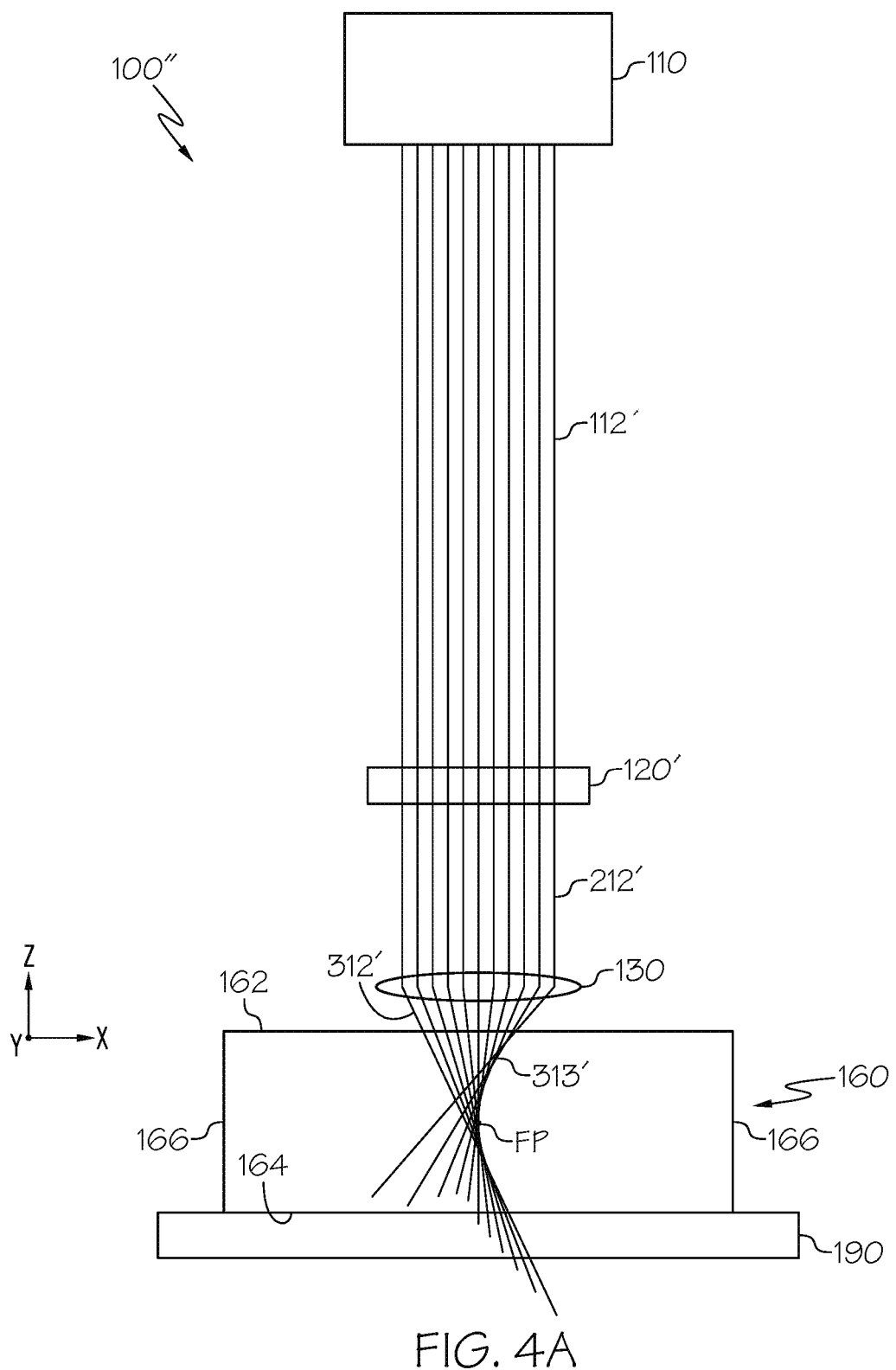
FIG. 4A schematically depicts an exemplary optical system that includes the phase-adjustment device of FIG. 1A and a shape adjustment device for forming a modified Airy beam and processing a transparent workpiece using the modified Airy beam, according to one or more embodiment shown and described herein.
Figure 4B:
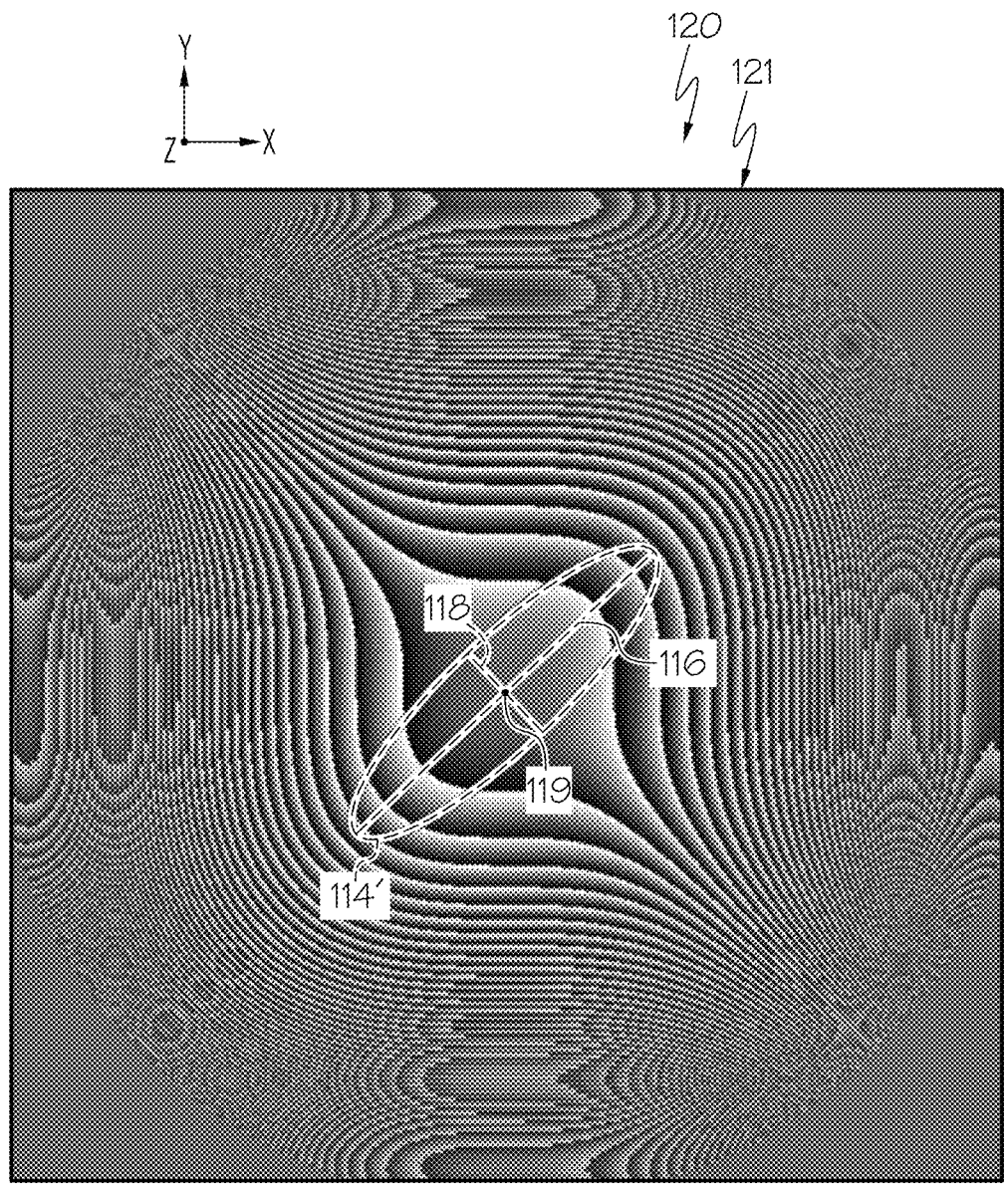
FIG. 4B schematically depicts a phase contour map of the phase-adjustment device of FIG. 4A with an asymmetric beam spot overlaid thereon, according to one or more embodiments shown and described herein.
Figure 4C:
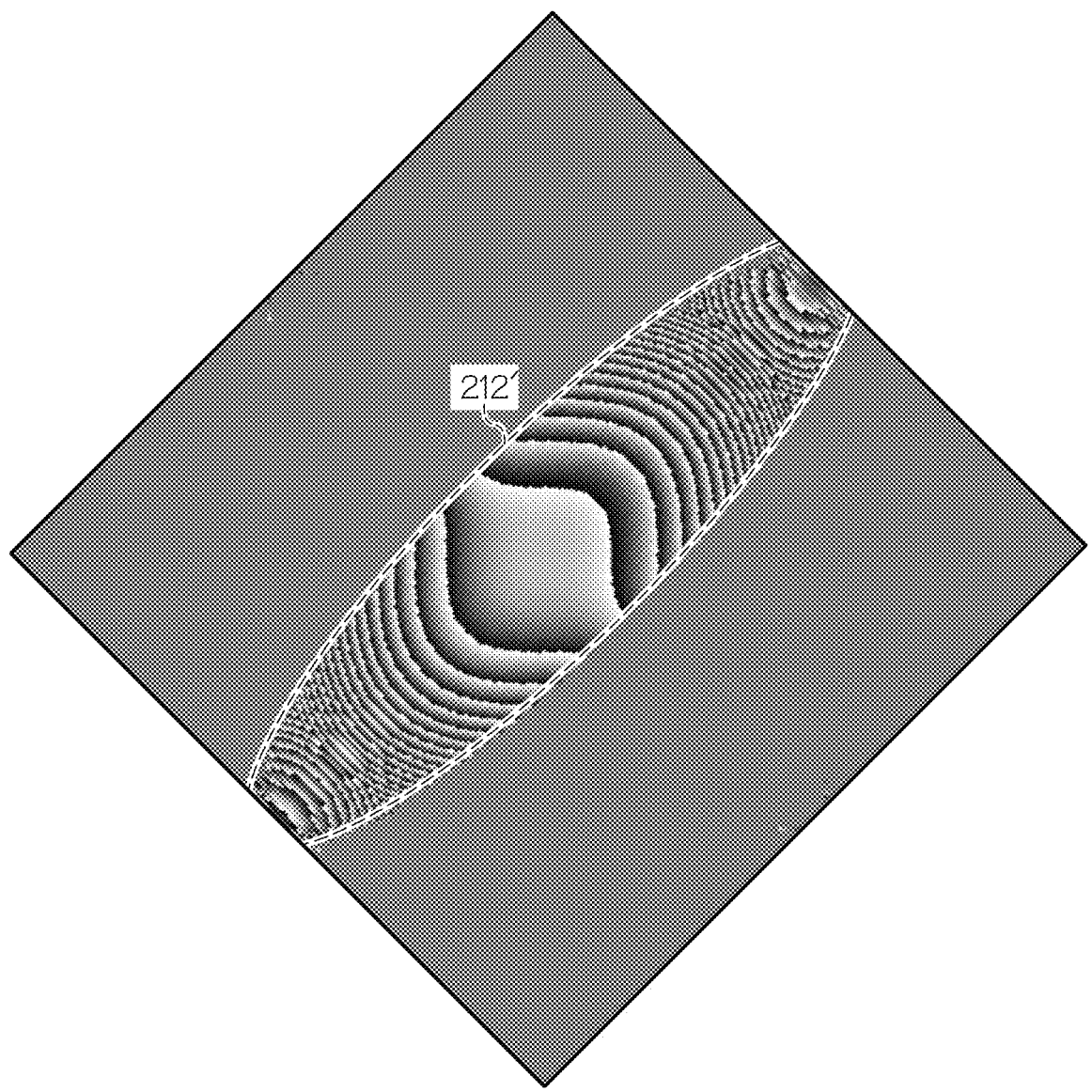
FIG. 4C schematically depicts the portion of the phase contour map of FIG. 4B that is impinged by the elliptical beam spot, according to one or more embodiments shown and described herein.

Referring now to FIGS. 4A-4C, another way to increase the efficiency of an Airy beam 312 is to impinge the phase-adjustment device 120 of FIG. 1A with an asymmetric laser beam, such as an elliptical beam. Asymmetric laser beams include asymmetric Gaussian laser beams and elliptical Gaussian laser beams. Similar to using the modified phase-adjustment device 120' of FIG. 3A, impinging the phase-adjustment device 120 (that is, a phase-adjustment device with a phase modulation frequency ratio of 1) with an asymmetric laser beam alters the size shape, and energy of the lobes of the resultant laser beam to produce a modified Airy beam 312' with a modified Airy beam focal region 313' upon focusing. Similar to the optical system 100' of FIG. 3A, the optical system 100" of FIG. 4A is configured to transform the laser beam 112 into the modified phase-adjusted laser beam 212' which, when focused using the focusing lens 130, forms the modified Airy beam 312' that focuses into the modified Airy beam focal region 313'. However, instead of using the modified phase-adjustment device 120', the optical system 100" includes the phase-adjustment device 120 of FIG. 1A and a beam shaping element that comprises one or more optical elements configured to alter the laser beam 112, which comprises a symmetrical cross-section shape into a modified laser beam 112', which comprises an asymmetric cross-sectional shape.

Referring now to FIGS. 4A and 4B, the modified laser beam 112' impinges the phase-adjustment device 120 comprising the phase mask 121 of FIG. 1B as an asymmetric beam spot 114' having a long axis 116 and a short axis 118 which cross at an axis intersection 119, resulting in an asymmetric phase modulation being imparted to the modified laser beam 112'. This forms the modified phase-adjusted laser beam 212' which, when focused using the focusing lens 130, forms the modified Airy beam 312' that focuses into the modified Airy beam focal region 313'. Further, FIG. 4C depicts the phase of the modified phase-adjusted laser beam 212' after the modified laser beam 112' impinges the phase-adjustment device 120. In some embodiments, the long axis 116 of the asymmetric beam spot 114' is 1.5 to 5 times longer than the short axis 118 of the asymmetric beam spot 114'.

The magnitude of the asymmetry of the cross section of the beam (e.g., cross sections or beam sports of the laser beam 112 and the modified laser beam 112' can be quantified by a beam spot aspect ratio, where the beam spot aspect ratio is defined as the ratio of the long axis 116 to the short axis 118. A symmetric beam cross section (such as the Gaussian cross section of the laser beam 112) has a beam spot aspect ratio of 1.0, while elliptical and other asymmetric beam cross sections (such as the asymmetric beam spot 114' of the modified laser beam 112') have beam spot aspect ratios greater than 1.0, for example, 1.1 or greater, 1.2 or greater, 1.4 or greater, 1.5 or greater, 1.6 or greater, 1.8 or greater, 2.0 or greater, 2.2 or greater, 2.4 or greater, 2.5 or greater, 2.6 or greater, 2.8 or greater, 3.0 or greater, 3.2 or greater, 3.4 or greater, 3.5 or greater, 3.6 or greater, 3.8 or greater, 4.0 or greater, 4.2 or greater, 4.4 or greater, 4.5 or greater, 4.6 or greater, 4.8 or greater, 5.0 or greater, 5.2 or greater, 5.4 or greater, 5.5 or greater, 5.6 or greater, 5.8 or greater, 6.0 or greater, 6.5 or greater, 7.0 or greater, 8.0 or greater, or any range having any two of these values as endpoints. While not intending to be limited by theory, increasing the beam spot aspect ratio of the asymmetric beam spot 114' (i.e., increasing the asymmetry of the asymmetric beam spot 114') increases the relative energy in the main lobe 315 of the resultant modified Airy beam focal region 313'.

Referring again to FIG. 4A, the beam shaping element is positioned upstream the phase-adjustment device 120 such that the laser beam 112 (e.g., a Gaussian beam with symmetric cross-section) emitted by the beam source 110 is transformed from the laser beam 112 to a modified laser beam 112' having cross-sectional asymmetry (i.e., an asymmetrical Gaussian beam) before impinging the phase-adjustment device 120. The phase-adjustment device 120 transforms the modified laser beam 112' into the modified phase-adjusted laser beam 212' which, when focused using the focusing lens 130, forms the modified Airy beam 312' that focuses into a modified Airy beam focal region 313'.

The beam shaping element comprises any known or yet to be developed optical component or assembly configured to transform a laser beam having a symmetrical cross section (such as a circular cross section) into a laser beam having an asymmetric cross section (such as an elliptical cross section). As one example, the beam shaping element may comprise one or more refractive optical components, such as cylindrical lenses, one or more diffractive optical components, such as spatial light modulators and phase plates, and combinations thereof. As another example, the beam shaping element may comprise an optical blocking element positioned to block a portion of the laser beam 112 propagating between the beam source 110 and the phase-adjustment device 120. As another example, the beam shaping element may comprise an optical delay plate positioned to block a portion of the laser beam 112 propagating between the beam source 110 and the phase-adjustment device 120 such that these portions combine to project the asymmetric beam spot 114' on the phase-adjustment device 120. As yet another example, the beam shaping element may comprise a waveplate, such as a split quarter waveplate positioned to induce orthogonal polarizations to different portions of the laser beam propagating between the beam source 110 and the phase-adjustment device 120 such that these portions combine incoherently at the phase-adjustment device 120 to project the asymmetric beam spot 114' on the phase-adjustment device 120.

Figure 5A:
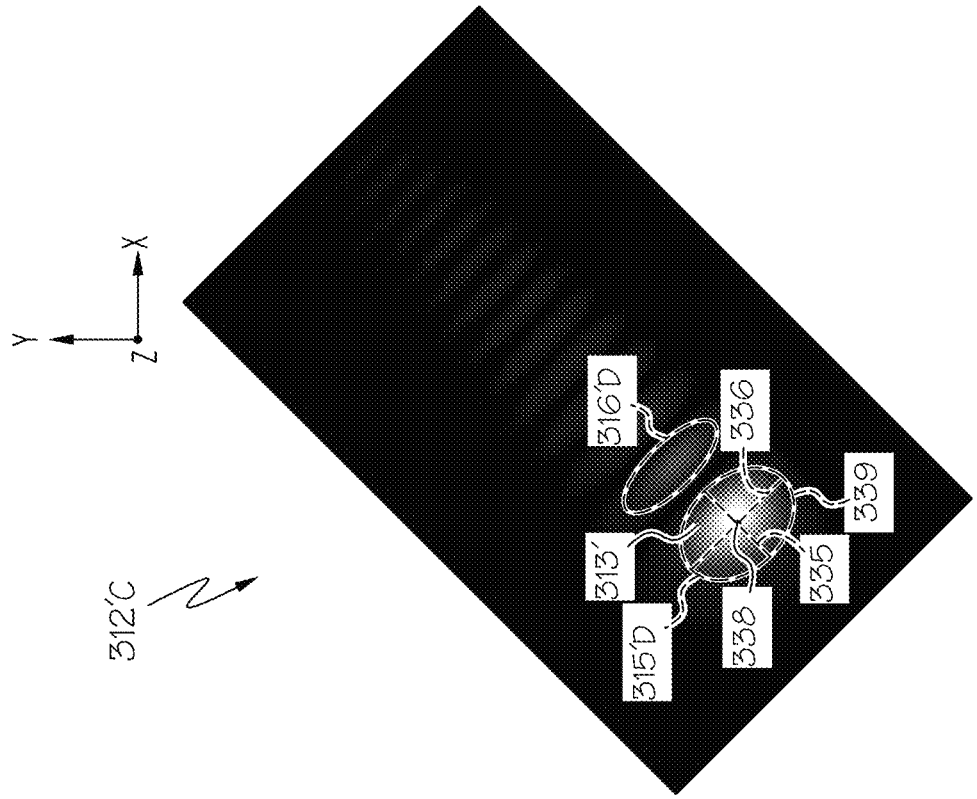
FIG. 5A schematically depicts a beam cross section of an Airy beam focal region formed using an exemplary asymmetric beam spot and the phase-adjustment device of FIG. 1A, according to one or more embodiments shown and described herein.
Figure 5B:
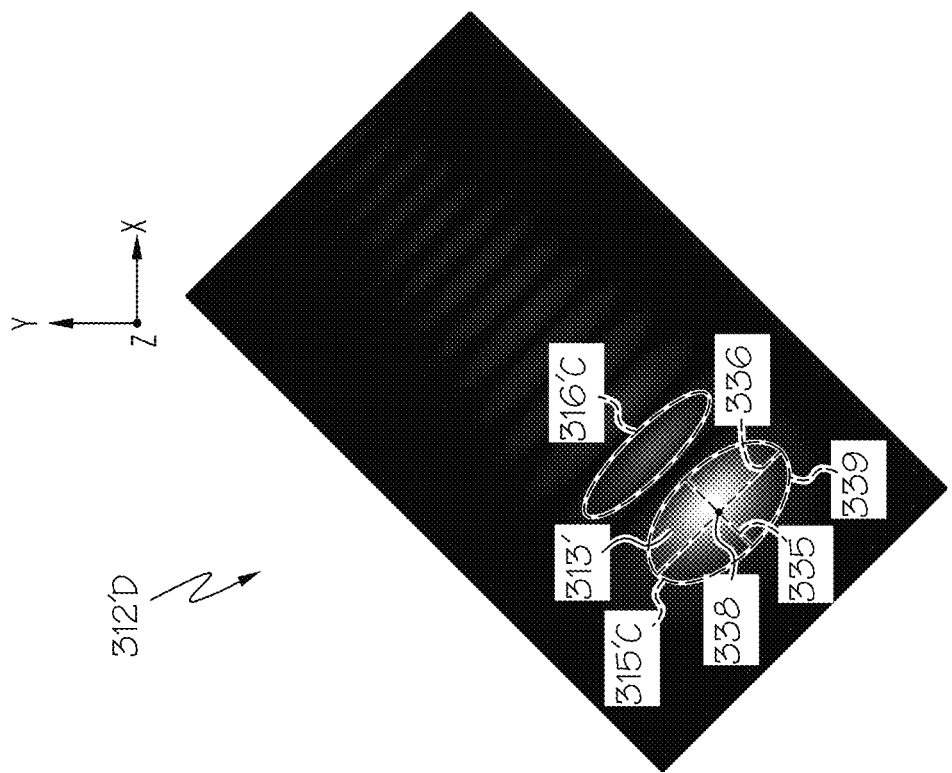
FIG. 5B schematically depicts a beam cross section of an Airy beam focal region formed using another exemplary asymmetric beam spot and the phase-adjustment device of FIG. 1A, according to one or more embodiments shown and described herein.

Referring now to FIG. 5A-5B, intensity distributions of beam cross sections of modified Airy beams 312' formed by impinging modified laser beams 112' having asymmetric beam spots 114' with different beam spot aspect ratios (i.e., different asymmetries) onto phase-adjustment device 120 are depicted. FIG. 5A depicts the intensity distribution of a beam cross section of an embodiment of the modified Airy beam 312' formed by impinging (traversing, reflecting) the modified laser beam 112' with an asymmetric beam spot 114' that has a 6 mm long axis and a 1.5 mm short axis 118 (i.e., a beam spot aspect ratio of 4.0) onto the phase-adjustment device 120. The modified Airy beam focal region 313' comprises a main lobe 315'C and side lobes 316'C in which the main lobe 315'C comprises 68% of the laser energy of the modified Airy beam focal region 313', while the main lobe 315 of the Airy beam focal region 313 of FIG. 1C comprises 47.7% of the laser energy of the Airy beam focal region 313.

FIG. 5B depicts the intensity distribution of a beam cross section of an embodiment of the modified Airy beam 312' and the modified Airy beam focal region 313' formed by impinging the modified laser beam 112' comprising a wavelength of 1064 nm with an asymmetric beam spot 114' that has a 6 mm long axis and a 2 mm short axis 118 (i.e., a beam spot aspect ratio of 3.0) onto the phase-adjustment device 120 and thereafter through the focusing lens 130 having a focal length of 30 mm. The modified Airy beam focal region 313' comprises a main lobe 315'D and side lobes 316'D in which the main lobe 315'D comprises 67% of the laser energy of the modified Airy beam focal region 313', while the main lobe 315 of the Airy beam focal region 313 of FIG. 1C comprises 47.7% of the laser energy of the Airy beam focal region 313.

Referring again to FIGS. 4A-5B, by increasing the beam spot aspect ratio of the modified laser beam 112', the relative laser energy of the main lobe 315 of the modified Airy beam 312' and the modified Airy beam focal region 313' is increased. Using the optical assembly 100" of FIG. 4A, at least 50%, at least 52%, or at least 55% of the laser energy of the modified Airy beam focal region 313' may be disposed in the main lobe 315, for example, at least 56% of the laser energy, at least 57% of the laser energy, at least 58% of the laser energy, at least 59% of the laser energy, at least 60% of the laser energy, at least 61% of the laser energy, at least 62% of the laser energy, at least 63% of the laser energy, at least 64% of the laser energy, at least 65% of the laser energy, at least 66% of the laser energy, at least 67% of the laser energy, at least 68% of the laser energy, at least 69% of the laser energy, at least 70% of the laser energy, at least 71% of the laser energy, at least 72% of the laser energy, or any range having any two of these values as endpoints.

Referring still to FIGS. 5A and 5B, the main lobes 315'C and 315'D of the modified Airy beam focal region 313' also comprise an asymmetrical shape having the lobe perimeter 339, similar to the main lobes 315'A, 315'B of FIGS. 3C and 3E. For example, the main lobes 315'C and 315'D, may have a lobe aspect ratio of 1.1 or greater, such as 1.2 or greater, 1.3 or greater, 1.4 or greater, 1.5 or greater, 1.6 or greater, 1.7 or greater, 1.8 or greater, 1.9 or greater, 2.0 or greater, 2.1 or greater, 2.2 or greater, 2.3 or greater, 2.4 or greater, 2.5 or greater, 2.6 or greater, 2.7 or greater, 2.8 or greater, 2.9 or greater, 3.0 or greater, 3.1 or greater, 3.2 or greater, 3.3 or greater, 3.4 or greater, 3.5 or greater, 3.6 or greater, 3.7 or greater, 3.8 or greater, 3.9 or greater, 4.0 or greater, or any range having any two of these values as endpoints.

As the main lobes 315'A-315'D of FIGS. 3C, 3E, 5A, and 5B comprise an asymmetric shape, when the modified Airy beam focal region 313'A-313'D is used to form the contour 170 of curved defects 172 (FIGS. 2A and 2B), the modified Airy beam focal region 313'A-313'D may be oriented such that the horizontal lobe axis 336 of the main lobe 315'A-315'D is aligned with the desired line of separation (i.e., the contour line 165) to help control crack direction during separation of the transparent workpiece 160 to improve the edge strength of the resultant non-square edge 168 (FIG. 2B). For example, curved defects 172 formed using the modified airy beam focal region 313' comprising the main lobe 315'A-315'D may comprise a central defect region 175 (FIG. 7A) formed at the axis intersection 338 of the horizontal lobe axis 336 and the vertical lobe axis 335 of the main lobe 315'A-315D and one or more radial arms 174 (FIG. 7A) formed in the direction of the horizontal lobe axis 336 of the main lobe 315'A-315'D. For example, the one or more radial arms 174 (FIG. 7A) may be oriented along the contour line 165 to help control crack direction during separation of the transparent workpiece 160. While FIG. 7A provides an illustrative example of a curved defect formed using any modified Airy beam focal region described above in which the long axis of the main lobe is aligned with the desired line of separation, the particular curved defect 172 depicted in FIG. 7A was formed using the modified laser beam focal region 313'C having the main lobe 315'C of FIG. 5A.

Referring now to FIGS. 1A-5B, embodiments are contemplated in which the beam shaping element of FIG. 4A is positioned upstream the phase-adjustment device 120' of FIG. 3A such that the laser beam 112 (e.g., a Gaussian beam with a symmetric cross-section) emitted by the beam source 110 is transformed from the laser beam 112 to the modified laser beam 112' having cross-sectional asymmetry (i.e., an asymmetrical Gaussian beam) before impinging the modified phase-adjustment device 120'. The modified phase-adjustment device 120' transforms the modified laser beam 112' into the modified phase-adjusted laser beam 212' which, when focused using the focusing lens 130, forms the modified Airy beam 312' that focuses into the modified Airy beam focal region 313'. Without intending to be limited by theory, combining the cross-sectional asymmetry of the modified laser beam 112' and the modified phase-adjustment device 120' having a phase modulation frequency ratio different from 1, the resultant main lobe 315' of the modified Airy beam focal region 313' may have an increased lobe aspect ratio when compared to embodiments using a modified laser beam 112' in combination with the phase adjustment device 120 (FIG. 4A) and embodiments using a laser beam 112 and the modified phase adjustment device] 120' (FIG. 3A). In other words, combining these techniques may further increase the lobe aspect ratio of the main lobe 315 of the modified Airy beam focal region 313'.

Referring now to FIGS. 1A-5B, in any of the embodiments, the laser beam 112 may comprise a pulsed laser beam such that the resultant Airy beam is a pulsed Airy beam comprising pulse bursts having 2 sub-pulses per pulse burst or more. Pulse bursts increase the amount of laser energy deposited by the main lobe 315 of the Airy beam focal region (i.e., a pulsed Airy beam focal region) in the transparent workpiece 160 without increasing the maximum intensity. In some embodiments, the pulsed Airy beam comprises a pulse burst having from 2 sub-pulses to 30 sub-pulses, such as from 2 sub-pulses to 25 sub-pulses, from 2 sub-pulses to 20 sub-pulses, from 2 sub-pulses to 25 sub-pulses, from 2 sub-pulses to 12 sub-pulses, from 2 sub-pulses to 10 sub-pulses, from 2 sub-pulses to 8 sub-pulses, from 2 sub-pulses to 5 sub-pulses or any range having any two of these values as endpoints. A pulse burst is a short and fast grouping of sub-pulses (i.e., a tight cluster of sub-pulses, such as sub-pulses that are emitted by the beam source 110 and interact with the material (i.e. MPA in the material of the transparent workpiece 160). The use of pulse bursts (as opposed to a single pulse operation) increases the size (e.g., the cross-sectional size) of the curved defects 172, which facilitates the connection of adjacent curved defects 172 when separating the transparent workpiece 160 along the contour 170, thereby minimizing crack formation into the bulk of the remainder of the transparent workpiece 160.

When the curved defects 172 of the contour 170 is formed with pulse bursts having at least two sub-pulses, the force necessary to separate the transparent workpiece 160 along contour 170 (i.e. the break resistance) is reduced compared to the break resistance of a contour 170 of the same shape with the same spacing between adjacent curved defects 172 in an identical transparent workpiece 160 that is formed using a single pulse laser having the same energy as the combined energies of the sub-pulses of the pulse burst. While not intending to be limited by theory, if the Airy beam focal region 313, 313' is directed into the transparent workpiece 160 as a pulse burst (i.e., a pulsed Airy beam focal region) and a time between temporally adjacent sub-pulses is equal to or less than the rate of thermal diffusion in the transparent workpiece 160, then the temperature rise in the transparent workpiece 160 from subsequent sub-pulses is additive. This additive temperature rise may increase the induced absorption imparted by the Airy beam focal region 313, 313' throughout the depth of the transparent workpiece 160 and reduce unwanted nonlinear effects.

Without intending to be limited by theory, the energy required to modify the transparent workpiece 160 is the pulse energy, which may be described in terms of pulse burst energy (i.e., the combined energy of all sub-pulses within the pulse burst). The pulse energy (for example, pulse burst energy) may be from 25 µJ to 1000 µJ or 25 µJ to 750 µJ, such as from 100 µJ to 600 µJ, 50 µJ to 500 µJ, or from 50 µJ to 250 µJ, for example, 25 µJ, 50 µJ, 75 µJ, 100 µJ, 200 µJ, 250 µJ, 300 µJ, 400 µJ, 500 µJ, 600 µJ, 750 µJ, or any range having any two of these values as endpoints, or any open-ended range having any of these values as a lower bound. Furthermore, each pulse burst may comprise a burst duration (i.e., a time between the start of first sub-pulse in the pulse burst and the end of the final sub-pulse in pulse burst) of from 10 ps to 50 ns, such as from 100 ps to 10 ns. In addition, each pulse burst may have a sub-pulse separation between temporally adjacent sub-pulses of from 1 ps to 500 ps, such as from 5 ps to 50 ps. Moreover, each pulse burst may comprise a repetition rate of from 100 kHz to 750 kHz, such as 200 kHz, 300 kHz, 400 kHz, 500 kHz, 600 kHz, 700 kHz, or any range having any two of these value as endpoints. Without intending to be limited by theory, by increasing the burst duration, while still retaining a time between temporally adjacent sub-pulses low enough to generate induced absorption and a fast temperature rise in the transparent workpiece 160, more power can be delivered to the transparent workpiece 160 while minimizing or even avoiding unwanted nonlinear effects.

In view of the foregoing description, it should be understood that laser processing of transparent workpieces may include using modified Airy beams to form curved defects in a transparent workpiece to minimize unintended damage to the transparent workpiece and facilitate efficient separation with minimal roughness on the resultant non-square edges. The modified Airy beams described herein include an increased amount of laser energy concentrated in the main lobe relative to an unmodified Airy beam formed by impinging a Gaussian laser beam onto a phase-adjustment device having a phase modulation frequency ratio of 1. As described herein, increased energy in the main lobe may be achieved using a modified phase-adjustment device or an asymmetric beam. As the main lobe is the portion of the Airy beam (e.g., portion of the Airy beam focal region) that is used to modify the transparent workpiece, increasing the percentage of laser power concentrated in the main lobe increases the efficiency of laser processing and improves process throughput. Furthermore, this modification adds asymmetry to the cross section of the curved defects to help control crack direction during separation of the transparent workpiece to improve the edge strength of the resultant non-square edge.

EXAMPLES

Example 1

Example 1 is an example contour 170A of curved defects 172A formed using an Airy beam and an Airy beam focal region that is unmodified is depicted in FIGS. 6A and 6B. FIG. 6A is a top view of the example contour 170A of curved defects 172A formed in an example transparent workpiece 160 and FIG. 6B is a side view of a single curved defect 172A. To achieve the side view of FIG. 6B, the example transparent workpiece 160 was cleaved perpendicular to the contour 170A to provide a view of a single curved defect 172A. The Airy beam and the Airy beam focal region used to form the contour 170A of curved defects 172A was formed using the optical assembly 100 of FIG. 1A using a pulse burst Gaussian laser beam having a wavelength of 1064 nm, 2-20 sub-pulses per burst, a sub-pulse width of 10 ps, a time spacing of 10 ns-100 ns between consecutive sub-pulses in the burst, a repetition rate of 1 kHz, and a 200 µJ pulse burst energy. The unmodified Airy beam used to form Example 1 was formed by passing a Gaussian beam having a 7.03 mm waist (twice the beam radius at which the beam intensity is $1/e^2$ of the maximum beam intensity) through a phase-adjustment device 120 comprising an Airy phase mask with phase modulation frequency ratio of 1 and then focusing the beam using a focusing lens 130 having a 10 mm focal length such that the focal point of the Airy beam focal region is at a center depth of the transparent workpiece 160. The contour 170A of curved defects 172A were formed in a transparent workpiece 160 comprising a 200 µm thick piece of non-ion exchanged Corning Gorilla® Glass. The transparent workpiece 160 was placed on a vacuum stage, and the Airy beam was scanned linearly across the first surface 162 of the transparent workpiece 160 at a scan speed of 15 mm/s. Spacing between adjacent curved defects 172A in the contour 170A is 15 µm.

Example 2

Figure 7B:
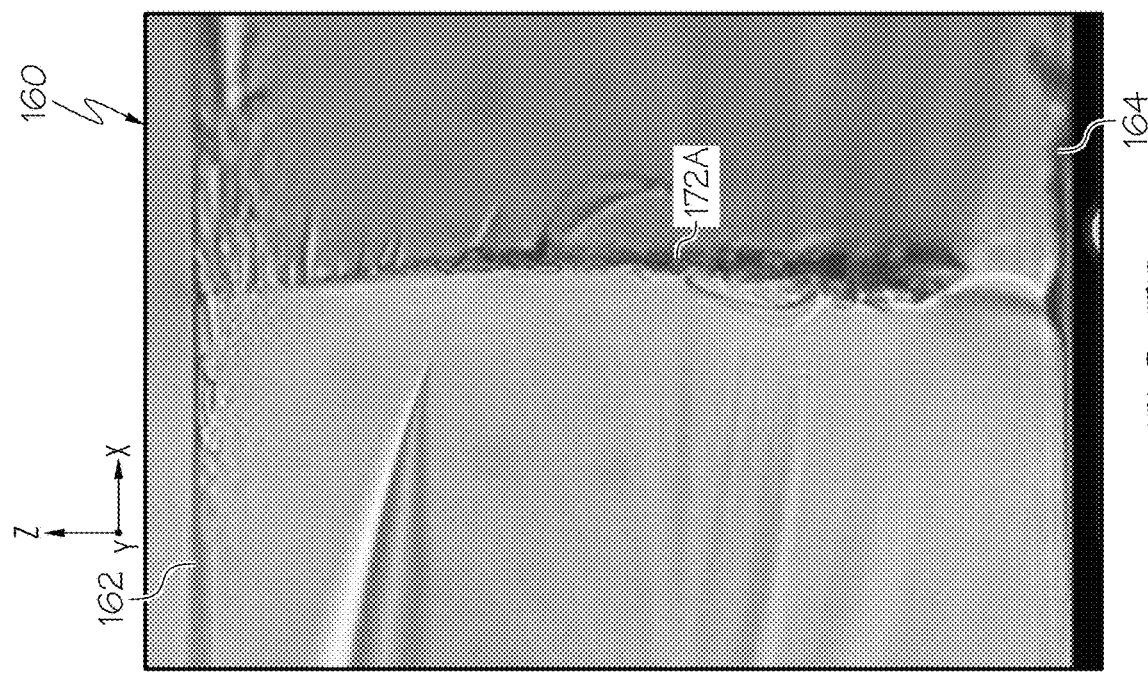
FIG. 7B is a side view of a curved defect of the exemplary contour of FIG. 7A, according to one or more embodiments shown and described herein.
Figure 7A:
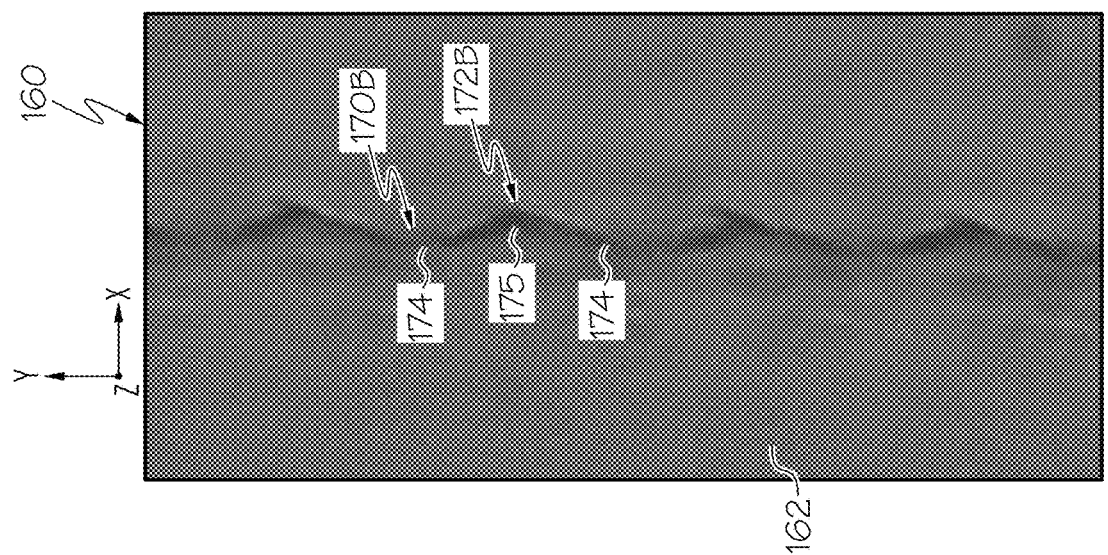
FIG. 7A is a top view of an exemplary contour of curved defects formed in a transparent workpiece using the optical assembly of FIG. 4A, according to one or more embodiments shown and described herein.

Example 2 is an example contour 170B of curved defects 172B is depicted in FIGS. 7A and 7B that is formed using an elliptical Airy beam and an elliptical Airy beam focal region generated using an elliptical Gaussian laser beam. FIG. 7A is a top view of the example contour 170B of curved defects 172B formed in an example transparent workpiece 160 and FIG. 7B is a side view of a single curved defect 172B. To achieve the side view of FIG. 7B, the example transparent workpiece 160 was cleaved perpendicular to the contour 170B to provide a view of a single curved defect 172B. The Airy beam and the Airy beam focal region used to form the contour 170A of curved defects 172A was formed using the optical assembly 100" of FIG. 4A using a pulse burst Gaussian laser beam having a wavelength of 1064 nm, 2-20 sub-pulses per burst, a sub-pulse width of 10 ps, a time spacing of 10 ns-100 ns between consecutive sub-pulses in the burst, a repetition rate of 1 kHz, and a 200 µJ pulse burst energy. The elliptical Airy beam of Example 2 was formed by passing a symmetric Gaussian beam through a beam shaping element comprising two cylindrical lenses with focal lengths of 100 mm and 300 mm, respectively, to form a collimated elliptical Gaussian beam with a beam spot aspect ratio of 3:1 before passing the elliptical beam through a phase-adjustment device 120 comprising an Airy phase mask with a phase modulation frequency ratio of 1 and then through focusing lens 130 comprising a 10 mm focal length such that the focal point of the elliptical Airy beam focal region is at a center depth of the transparent workpiece 160. The contour 170B of curved defects 172B were formed in a transparent workpiece 160 comprising a 200 µm thick piece of non-ion exchanged Corning Gorilla® Glass. The transparent workpiece 160 was placed on a vacuum stage, and the Airy beam was scanned linearly across the first surface 162 of the transparent workpiece 160 at a scan speed of 15 mm/s. Spacing between adjacent curved defects 172B in the contour 170B is 15 µm.

As shown in FIG. 7A, the elliptical Airy beam used in Example 2 forms curved defects 172B that comprise the central defect region 175 and one or more radial arms 174 (which are formed in the direction of a long axis of the main lobe of the elliptical Airy beam, such as the modified Airy beam focal region 313' of FIGS. 3A-5B) As shown in FIG. 7A, the one or more radial arms 174 may be oriented along the desired line of separation (e.g., the contour line). In comparison to the curved defects 172A of Example 1, the curved defects 172B of Example 2 are more strongly linked together to help control crack direction during separation of the transparent workpiece 160. Furthermore, as shown in FIG. 7B, the curved defect 172B has increased curvature when compared to the curved defect 172A. This is achieved by increasing the numerical aperture of the focusing lens 130.

Example 3

Figure 8A:
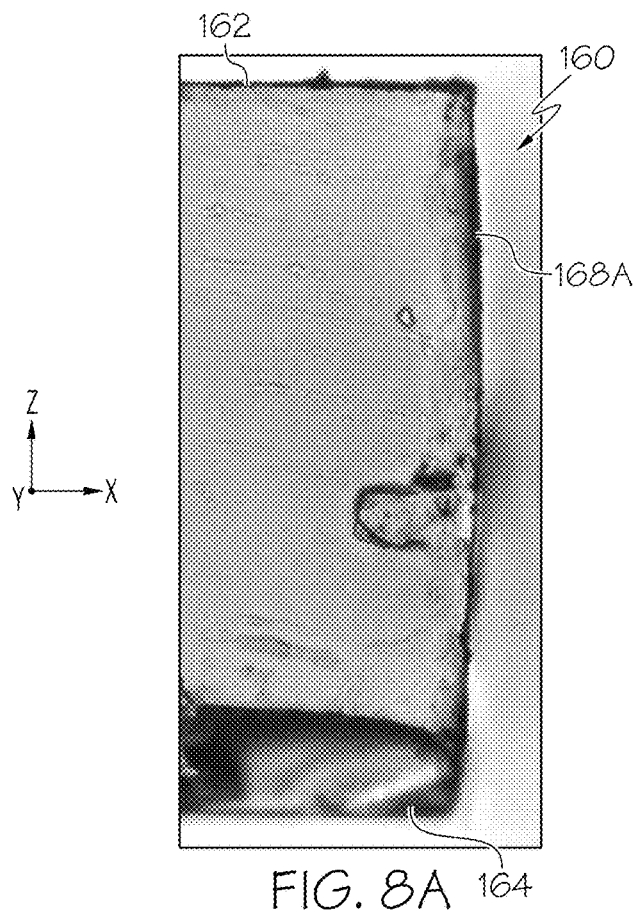
FIG. 8A is a side view of an exemplary non-square edge comprising a bullnose shape formed in a transparent workpiece using the laser processing methods of the present disclosure, according to one or more embodiment shown and described herein.
Figure 8B:
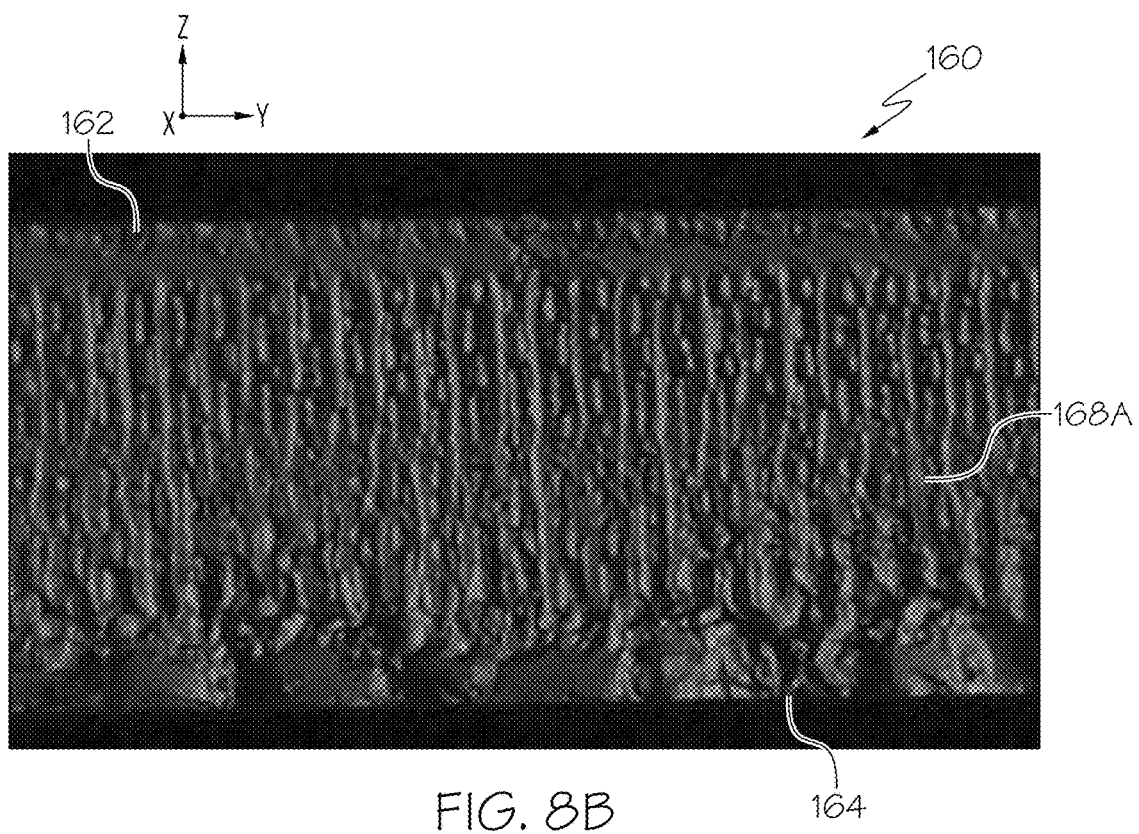
FIG. 8B is a front view of the exemplary non-square edge comprising a bullnose shape of FIG. 8A, according to one or more embodiment shown and described herein.

Example 3 is an example non-square edge 168A (a so-called bullnose edge) as shown in FIGS. 8A and 8B. FIG. 8A is a side view of the example non-square edge 168A comprising a bullnose shape formed in an example transparent workpiece 160 of non-ion exchanged Corning Gorilla® Glass with a thickness of 200 µm. FIG. 8B is a front view of the example non-square edge 168A. The example non-square edge 168A was formed in the example transparent workpiece 160 using the optical assembly 100" of FIG. 4A to form an elliptical Airy beam. The elliptical Airy beam is a pulsed beam comprising 300 µJ pulse bursts having 9 sub-pulses with a sub-pulse separation of 12.5 ns between each sub pulse and a burst duration of 720 ns. The pulse bursts used in Example 3 were repeated with a repetition rate of 200 kHz. During the laser processing of Example 3, the example transparent workpiece 160 was translated relative to the elliptical Airy beam such that the pitch of adjacent pulse bursts impinging the example transparent workpiece 160 was 18 µm and thus the spacing between adjacent curved defects used to form the non-square edge 168A was 18 µm.

Example 4

Figure 9:
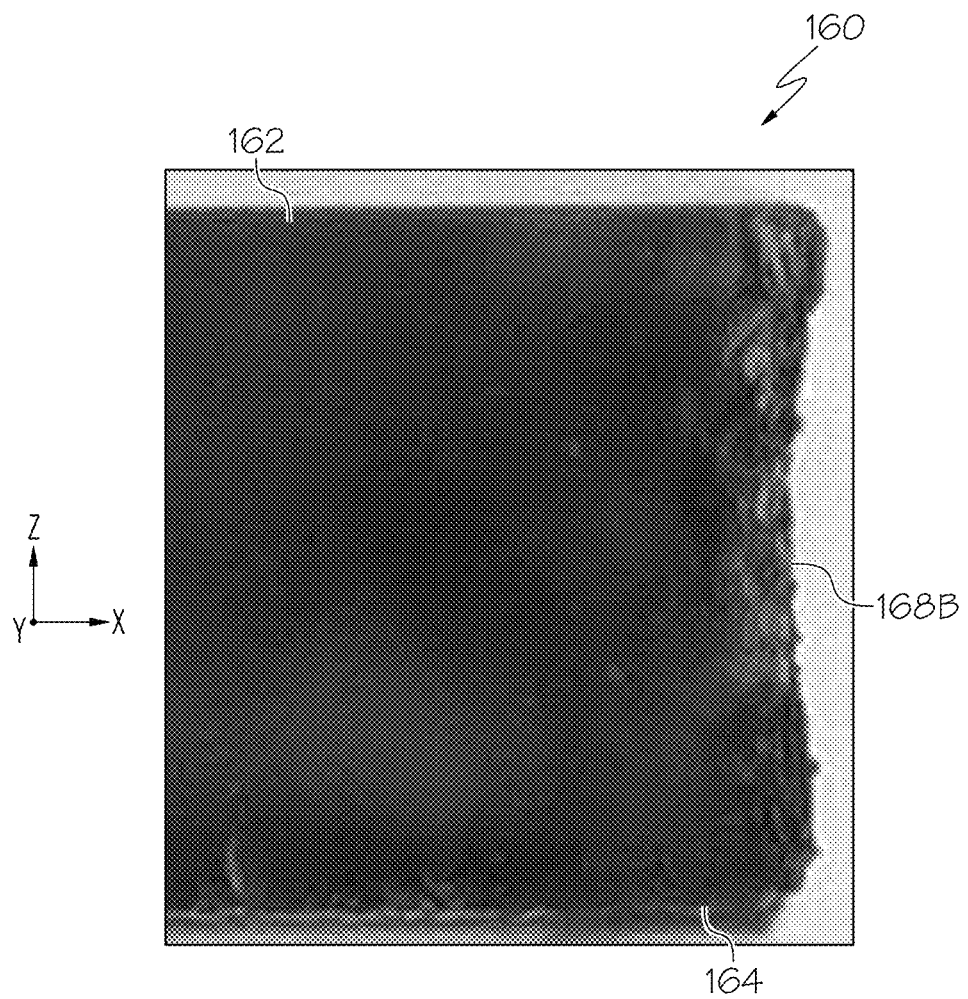
FIG. 9 is a side view of an exemplary non-square edge comprising a inverse bullnose shape formed in a transparent workpiece using the laser processing methods of the present disclosure, according to one or more embodiment shown and described herein.

Example 4 is an example non-square edge 168B that is an inverse bullnose as shown in FIG. 9. FIG. 9 is a side view of an example non-square edge 168B comprising an inverse bullnose shape formed in a transparent workpiece 160 formed in an example transparent workpiece 160 of non-ion exchanged Corning Gorilla® Glass with a thickness of 200 µm. Similar to the non-square edge 168A of Example 3, the example non-square edge 168B was formed in the example transparent workpiece 160 using the optical assembly 100" of FIG. 4A to form an elliptical Airy beam. The elliptical Airy beam is a pulsed beam comprising 300 µJ pulse bursts having 9 sub-pulses with a sub-pulse separation of 12.5 ns between each sub pulse and a burst duration of 720 ns. The pulse bursts used in Example 4 were repeated with a repetition rate of 200 kHz. Also similar to the non-square edge 168A of Example 3, during the laser processing of Example 3, the example transparent workpiece 160 was translated relative to the elliptical Airy beam such that the pitch of adjacent pulse bursts impinging the example transparent workpiece 160 was 18 µm and thus the spacing between adjacent curved defects used to form the non-square edge 168B was 18 µm. Moreover, to form the inverse bullnose shape of the non-square edge 168B, the numerical aperture of the focusing lens 130, the cubic coefficient of the phase-adjustment device 120, and the laser parameters may be altered. Indeed, these parameters may be altered to form non-square edges with a variety of different curvatures.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method comprising directing a laser beam onto a phase-adjustment device such that the laser beam downstream the phase-adjustment device comprises a modified Airy beam having a modified Airy beam focal region comprising a main lobe and a plurality of side lobes, wherein the main lobe comprises a lobe aspect ratio of 1.2 or greater, and wherein the phase-adjustment device comprises a phase modulation function $\emptyset = (\alpha k)^3 (x^3 + (\alpha_y y)^3)$, where $\alpha$ is a frequency of phase $$k = \frac{2\pi}{\lambda},$$

modulation where $\lambda$ is a wavelength of the laser beam, x and y are spatial coordinates of the phase-adjustment device, and $\alpha_y$ is a phase modulation frequency ratio which is 0.8 or less.

2. The method of claim 1, wherein the lobe aspect ratio of the main lobe is 2 or greater.

3. The method of claim 1, wherein at least 65% of a laser energy of the modified Airy beam focal region is disposed in the main lobe.

4. The method of claim 1, wherein the phase-adjustment device comprises a phase plate having a cubic phase modulation.

5. The method of claim 1, wherein the laser beam is a pulsed laser beam comprising pulse bursts and each pulse burst of the pulsed laser beam comprises from 2 sub-pulses to 20 sub-pulses.

6. The method of claim 1, further comprising directing the modified Airy beam onto a transparent workpiece such that the modified Airy beam forms the modified Airy beam focal region in the transparent workpiece, the modified Airy beam focal region inducing absorption in the transparent workpiece, the induced absorption producing a curved defect in the transparent workpiece.

7. The method of claim 6, further comprising translating at least one of the transparent workpiece and the modified Airy beam relative to each other along a contour line to form a contour comprising a plurality of curved defects.

8. The method of claim 6, wherein the transparent workpiece comprises borosilicate glass, soda-lime glass, aluminosilicate glass, alkali aluminosilicate glass, alkaline earth aluminosilicate glass, alkaline earth boro-aluminosilicate glass, fused silica, sapphire, silicon, or gallium arsenide.

9. A method comprising:
    directing a laser beam output by a beam source onto a beam shaping element such that the laser beam downstream the beam shaping element comprising a modified laser beam having an asymmetric cross sectional shape; and
    directing the modified laser beam onto a phase-adjustment device such that the modified laser beam projects an asymmetric beam spot onto the phase-adjustment device and the modified laser beam downstream the phase-adjustment device comprises a modified Airy beam, wherein the asymmetric beam spot comprises a beam spot aspect ratio of 1.5 or greater, and
    wherein the phase-adjustment device comprises a phase modulation function $\emptyset = (\alpha k)^3 (x^3 + (\alpha_y y)^3)$, where $\alpha$ is a frequency of phase modulation, $$k = \frac{2\pi}{\lambda},$$

where $\lambda$ is a wavelength of the laser beam, x and y are spatial coordinates of the phase-adjustment device and $\alpha_y$ is a phase modulation frequency ratio which is 0.8 or less.

10. The method of claim 9, wherein the modified Airy beam comprises a modified Airy beam focal region comprising a main lobe and a plurality of side lobes and at least 59% of a laser energy of the modified Airy beam focal region is disposed in the main lobe.

11. The method of claim 9, wherein the beam spot aspect ratio is 3.0 or greater.

12. The method of claim 9, wherein the phase-adjustment device comprises a phase plate having a cubic phase modulation.

13. The method of claim 9, wherein a modified Airy beam focal region comprises a main lobe and a plurality of side lobes and the main lobe comprises a lobe aspect ratio of 2 or greater.

14. The method of claim 9, further comprising directing the modified Airy beam onto a transparent workpiece such that the modified Airy beam forms a modified Airy beam focal region in the transparent workpiece, the modified Airy beam focal region inducing absorption in the transparent workpiece, the induced absorption producing a curved defect in the transparent workpiece.

15. The method of claim 14, wherein:
- the modified Airy beam focal region comprises a main lobe and a plurality of side lobes, wherein the main lobe is asymmetric, comprises a horizontal lobe axis, a vertical lobe axis, and a lobe aspect ratio of 1.2 or greater; and
- when the modified Airy beam focal region induces absorption in the transparent workpiece to form each curved defect, the horizontal lobe axis of the main lobe of the modified Airy beam focal region is aligned with at least one radial arm of the curved defect.

16. The method of claim 9, wherein the laser beam is a pulsed laser beam comprising pulse bursts and each pulse burst of the pulsed laser beam comprises from 2 sub-pulses to 20 sub-pulses.

* * * * *